US012711381B2

(12) United States Patent
Estep

(10) Patent No.: US 12,711,381 B2
(45) Date of Patent: Aug. 18, 2026

(54) NEURAL NETWORK TRANSPOSE LAYER REMOVAL

(71) Applicant: Micron Technology, Inc., Boise, ID (US)

(72) Inventor: Patrick Estep, Rowlett, TX (US)

(73) Assignee: Micron Technology, Inc., Boise, ID (US)

( * ) Notice: Subject to any disclaimer, the term of this patent is extended or adjusted under 35 U.S.C. 154(b) by 1161 days.

(21) Appl. No.: 17/405,738

(22) Filed: Aug. 18, 2021

(65) Prior Publication Data

US 2023/0068168 A1 Mar. 2, 2023

(51) Int. Cl.

*G06N 3/082* (2023.01)
*G06F 9/38* (2018.01)
*G06N 3/04* (2023.01)

(52) U.S. Cl.

CPC ........... *G06N 3/082* (2013.01); *G06F 9/3887* (2013.01); *G06N 3/04* (2013.01)

(58) Field of Classification Search

CPC ......... G06N 3/082; G06N 3/04; G06F 9/3887
See application file for complete search history.

(56) References Cited

U.S. PATENT DOCUMENTS 8,122,229 B2 2/2012 Wallach et al.
8,156,307 B2 4/2012 Wallach et al.
8,205,066 B2 6/2012 Brewer et al.
8,423,745 B1 4/2013 Brewer
8,561,037 B2 10/2013 Brewer et al.
9,710,384 B2 7/2017 Wallach et al.
10,990,391 B2 4/2021 Brewer
10,990,392 B2 4/2021 Brewer
11,093,251 B2 8/2021 Brewer
2008/0270708 A1 10/2008 Warner et al.
2012/0079177 A1 3/2012 Brewer et al.

(Continued)

FOREIGN PATENT DOCUMENTS

WO 2010051167 5/2010
WO 2013184380 12/2013

(Continued)

OTHER PUBLICATIONS

Ma, Wei, and Jun Lu. "An equivalence of fully connected layer and convolutional layer." arXiv preprint arXiv: 1712.01252 (2017). (Year: 2017).*

(Continued)

*Primary Examiner* — Li B. Zhen
*Assistant Examiner* — Griffin Tanner Bean
(74) *Attorney, Agent, or Firm* — Schwegman Lundberg & Woessner, P.A.

(57) ABSTRACT

Devices and techniques for neural network transpose layer removal are described herein. A neural network model that includes matrices of synaptic weights arranged in several layers is obtained. The neural network model is inspected to determine whether a transposition of a matrix to a fully connected layer exists. If there is a matrix transposition, then a modified neural network model is created by changing values of the fully connected layer to correspond to values in the matrix prior to the transposition and eliminating the transposition. The modified neural network model can then be provided to computer hardware to perform inference operations.

29 Claims, 13 Drawing Sheets

(56) References Cited

U.S. PATENT DOCUMENTS

| | | | |
|---|---|---|---|
| 2013/0332711 | A1 | 12/2013 | Leidel et al. |
| 2015/0143350 | A1 | 5/2015 | Brewer |
| 2015/0206561 | A1 | 7/2015 | Brewer et al. |
| 2019/0042214 | A1 | 2/2019 | Brewer |
| 2019/0171604 | A1 | 6/2019 | Brewer |
| 2019/0243700 | A1 | 8/2019 | Brewer |
| 2019/0303154 | A1 | 10/2019 | Brewer |
| 2019/0324928 | A1 | 10/2019 | Brewer |
| 2019/0340019 | A1 | 11/2019 | Brewer |
| 2019/0340020 | A1 | 11/2019 | Brewer |
| 2019/0340023 | A1 | 11/2019 | Brewer |
| 2019/0340024 | A1 | 11/2019 | Brewer |
| 2019/0340027 | A1 | 11/2019 | Brewer |
| 2019/0340035 | A1 | 11/2019 | Brewer |
| 2019/0340154 | A1 | 11/2019 | Brewer |
| 2019/0340155 | A1 | 11/2019 | Brewer |
| 2020/0320369 | A1* | 10/2020 | Meng ...................... G06F 17/16 |
| 2020/0356375 | A1 | 11/2020 | Jiang et al. |
| 2021/0055964 | A1 | 2/2021 | Brewer |
| 2021/0064374 | A1 | 3/2021 | Brewer |
| 2021/0064435 | A1 | 3/2021 | Brewer |
| 2021/0149600 | A1 | 5/2021 | Brewer |

FOREIGN PATENT DOCUMENTS

| | | |
|---|---|---|
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

OTHER PUBLICATIONS

Xu, Dawen, et al. "FCN-engine: Accelerating deconvolutional layers in classic CNN processors." 2018 IEEE/ACM International Conference on Computer-Aided Design (ICCAD). IEEE, 2018. (Year: 2018).*

Chang, Xuepeng, et al. "A mixed-pruning based framework for embedded convolutional neural network acceleration." IEEE Transactions on Circuits and Systems I: Regular Papers 68.4 (2021): 1706-1715. (Year: 2021).*

Rotem, Nadav, et al. "Glow: Graph lowering compiler techniques for neural networks." arXiv preprint arXiv:1805.00907 (2018). (Year: 2018).*

"International Application Serial No. PCT US2022 074197, International Search Report mailed Nov. 15, 2022", 3 pages.

"International Application Serial No. PCT US2022 074197, Written Opinion mailed Nov. 15, 2022", 4 pages.

Dawen, Xu, "FCN-Engine: Accelerating Deconvolutional Layers in Classic CNN Processors", IEEE ACM International Conference on Computer-Aided Design (ICCAD), (Jan. 3, 2019), 6 pages.

Wei, Ma, "An Equivalence of Fully Connected Layer and Convolutional Layer", arXiv: 1712.01252, (Dec. 2017), 9 pages.

* cited by examiner

NEURAL NETWORK TRANSPOSE LAYER REMOVAL

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
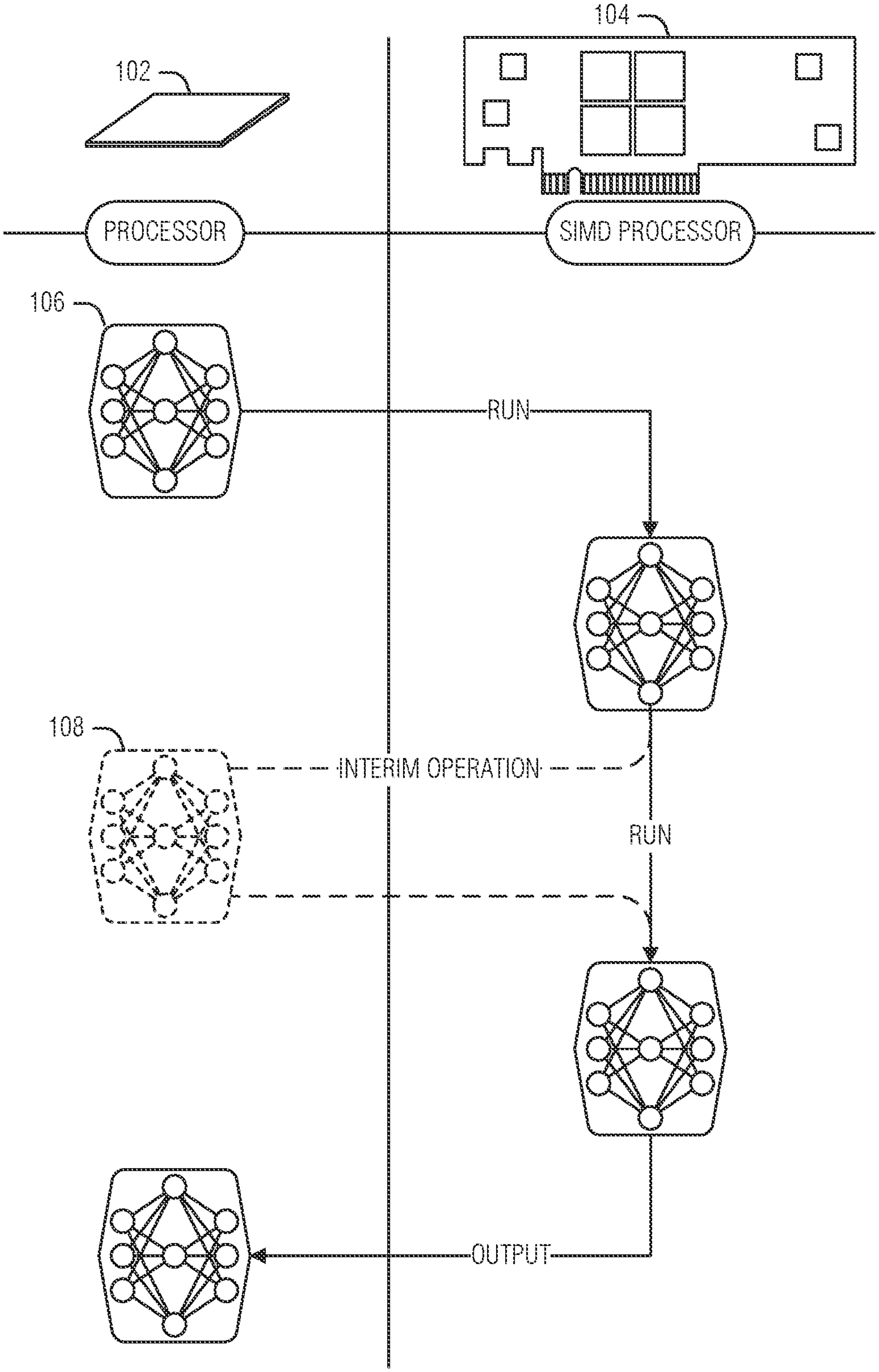
FIG. 1 illustrates example transitions between processing circuitry for a neural network, according to an embodiment.

Recent advances in materials, devices, and integration technology, can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general purpose processors, and user-accessible accelerators, with a custom compute fabric to facilitate intensive operations, particularly in environments where high cache miss rates are expected.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric, at each node can have its own processor(s) or accelerator(s) and can operate at higher bandwidth than the hybrid threading processor. Different nodes in a compute-near-memory system can be differently configured, such as having different compute capabilities, different types of memories, different interfaces, or other differences. However, the nodes can be commonly coupled to share data and compute resources within a defined address space.

In an example, a compute-near-memory system, or a node within the system, can be user-configured for custom operations. A user can provide instructions using a high-level programming language, such as C/C++, that can be compiled and mapped directly into a dataflow architecture of the system, or of one or more nodes in the CNM system. That is, the nodes in the system can include hardware blocks (e.g., memory controllers, atomic units, other customer accelerators, etc.) that can be configured to directly implement or support user instructions to thereby enhance system performance and reduce latency.

In an example, a compute-near-memory system can be particularly suited for implementing a hierarchy of instructions and nested loops (e.g., two, three, or more, loops deep, or multiple-dimensional loops). A standard compiler can be used to accept high-level language instructions and, in turn, compile directly into the dataflow architecture of one or more of the nodes. For example, a node in the system can include a hybrid threading fabric accelerator. The hybrid threading fabric accelerator can execute in a user space of the CNM system and can initiate its own threads or sub-threads, which can operate in parallel. Each thread can map to a different loop iteration to thereby support multi-dimensional loops. With the capability to initiate such nested loops, among other capabilities, the CNM system can realize significant time savings and latency improvements for compute-intensive operations.

Figure 9A:
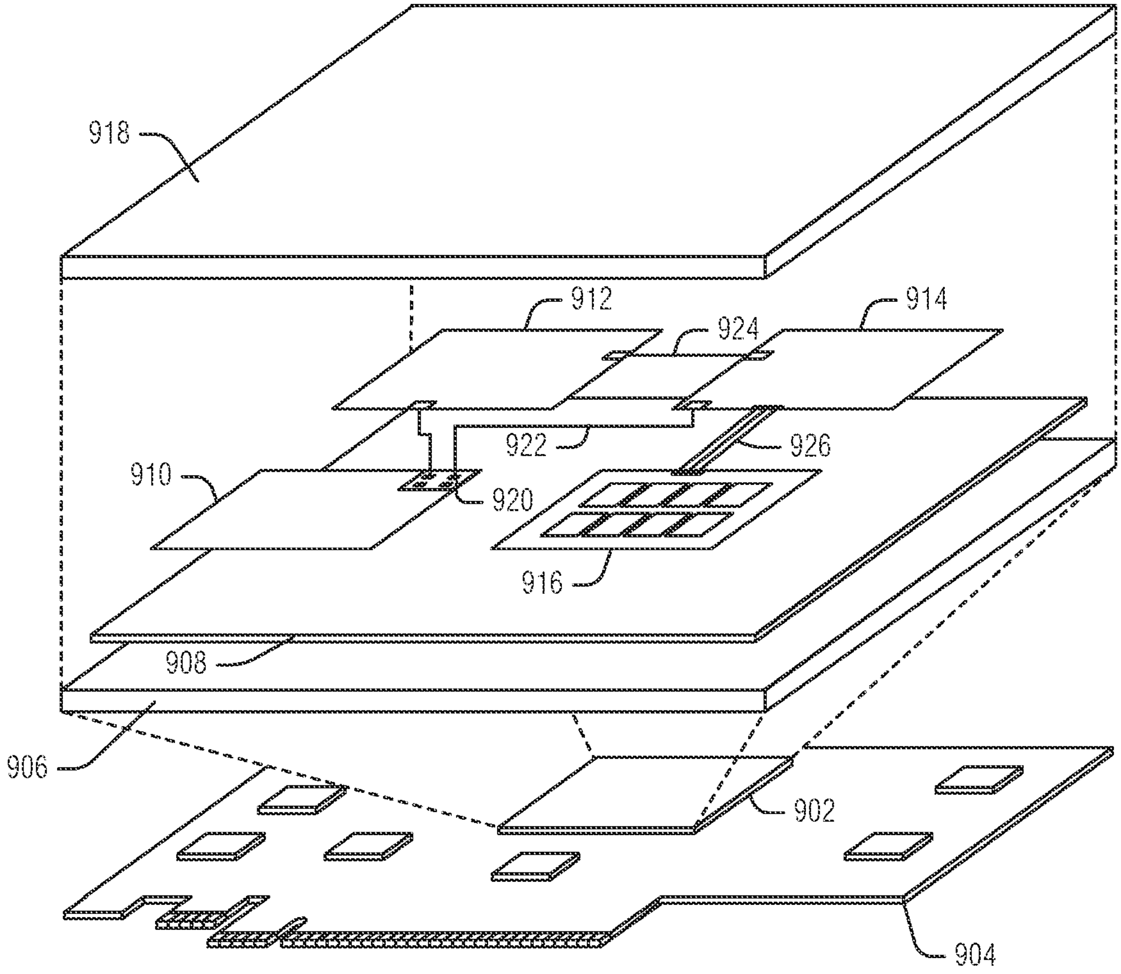
FIG. 9A illustrates generally an example of a chiplet system, according to an embodiment.
Figure 9B:
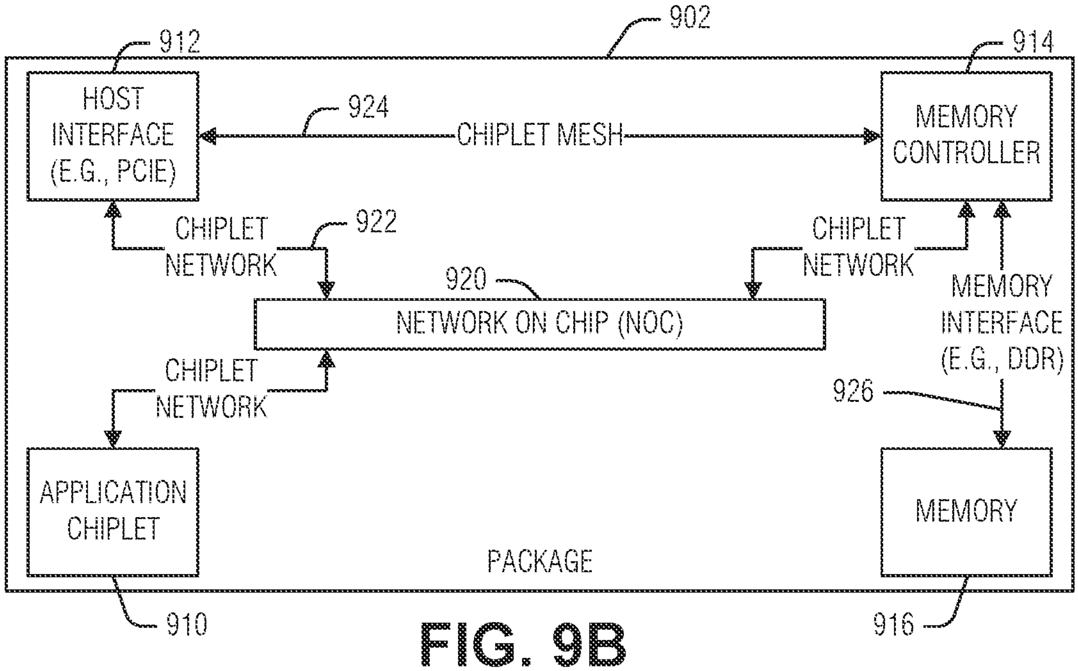
FIG. 9B illustrates generally a block diagram showing various components in the chiplet system from the example of FIG. 9A.

A compute-near-memory system, or nodes or components of a compute-near-memory system, can include or use various memory devices, controllers, and interconnects, among other things. In an example, the system can comprise various interconnected nodes and the nodes, or groups of nodes, can be implemented using chiplets. Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide production benefits than single die chips, including higher yields or reduced development costs. FIG. 9A and FIG. 9B, discussed below, illustrate generally an example of a chiplet system such as can comprise a compute-near-memory system.

The CNM system described herein is a good platform for a variety of artificial neural network applications. The low latency and efficient concurrency offered by, for example, the combination of a hybrid threading processor enables the often large number of calculations (e.g., linear algebraic operations) included in artificial neural network inference operations to be performed quickly (e.g., in real-time) as can be necessary for applications such as automobile sensing (e.g., to facilitate autonomous driving and the like).

In general, artificial neural networks includes nodes—which can be referred to as neurons though other biologic metaphors may also be used such as synapses, axons, etc.—connections between nodes, and weights (e.g., signal modifiers) on those connections. The neurons are often organized into layers, with an input layer accepting, usually numeric, input data and an output layer providing a result. Generally, the "deeper" a neural network, the more layers there are between an input layer and an output layer. Often, when input data is provided to an input neuron, an activation function determines which of the input neuron connections the signal will be propagated. When the signal is propagated on the connection, the connection weight can modify (e.g., the strength or magnitude) of the signal and delver the modified input value to the next neuron. This process continues until the output layer is reached.

There are a variety of artificial neural network organizations to address different problem domains. For example, recurrent neural networks (RNNs), like other artificial neural networks, include forward connections—from layers closer to the input layer towards the output layer—as well as backwards connections—from layers closer to the output layer towards the input layer. The backwards connections enable the comparison of past events with current events; a technique often used in time-varying signals such as speech recognition or classification. Generally, the terms prior and subsequent, or other positional terms, refer to the direction of travel of data from the input to the output. Thus, the input layer is prior to all other layers and the output layer is subsequent to all other layers. Forward connections are from a prior to layer to a subsequent layer whereas backwards connections are from a subsequent layer to a prior layer.

Convolutional neural networks (CNNs) are another artificial neural network organization. Generally, a CNN is organized to divide input into multiple dimensions of features by convolving feature detectors over the input. Thus, feature detection at various places within the input are determined. As the layers progress towards the output layer, relationships between the discovered features are abstracted to evaluate the presence of certain feature combinations. For example, given an image of a writing sample, the first features may be small line fragments (e.g., a straight line, a quarter circle, etc.). At a deeper layer, combinations of these segments are combined into letters; at a deeper layer, the letters are combined into word, etc., until an output is reached. Often, a CNN will be organized such that the convolving feature detection and assembly terminates and a non-convolving organization proceeds towards the output. Here, the macro features, constructed from the smaller features, can be provided to a fully connected layer to perform classifications on the input data.

Thus, CNNs are primarily comprised of layers performing a variety of linear algebra operations. Convolution layers generally include matrix and vector operations which are computationally expensive. Single-input Multiple-output (SIMD) processor arrangements—such as is often found in graphic processing units (GPUs) or field programmable gate arrays (FPGAs)—are often used to provide performant platforms for these layers.

As noted above, there are often other non-convolution layers present in CNNs. These non-convolutional layers, or operations between layers, can be challenging for SIMD architectures (e.g., traditional machine learning accelerators). An example of such a challenging layer is a transpose layer. A transpose layer reorders matrix data—often used to represent connection weights between neurons—to rearrange the dimensions of a matrix. This operation does not lend itself to SIMD execution because the same operation is not applied to different data. Thus, the transpose is often performed on an attached host processor (e.g., a single-instruction single-data (SISD) or multiple-instruction multiple-data (MIMD)—which entails first moving the matrix to the host, performing the transpose, then moving the transposed matrix back to the accelerator. Suspending operations on the accelerator, moving the transpose operation to the host, and resuming on the accelerator one the transpose is complete can impose a significant bottleneck to CNN performance.

To address the issues noted above of transpose layers in CNNs on SIMD accelerators, the transpose layers can be removed. Specifically, when a transpose layer precedes a fully connected (FC) layer, the weights of the FC layer can be modified to implement the transpose operation without the transpose layer. This can be accomplished by a compiler for the accelerator compiling a trained CNN. Generally, the transpose layer will transpose a matrix from one dimension to another (e.g., a three by two matrix into a two by three matrix). The transposed matrix is flattened (e.g., into a matrix with one dimension being one), the neurons of the flattened layer being fully connected to a subsequent layer making an FC layer. When the compiler detects a transpose layer connected to a FC layer, the compiler determines a new flattened layer for the matrix without the transpose, resulting in different weight connections in the FC layer than those in the source CNN. These weight connections are then used in place of the source CNN weight connections. Because every neuron is connected in the FC layer, rearranging the weights effectively implements the transpose without having to leave the accelerator. Thus, the transpose bottleneck is removed by folding the transpose functionality into the FC layer. Additional details and examples are provided below.

FIG. 1 illustrates example transitions between processing circuitry for a neural network, according to an embodiment.

As illustrated, a host processor 102 runs a neural network model 106 on an accelerator 104 (e.g., a SIMD processor) to eventually produce an output by the neural network model 106, such as image classification, feature detection, etc. The interim operation 108 illustrates a transition of processing during the run from the accelerator 104 back to the host processor 102, or an equivalent processor, to provide some computation before the run can continue on the accelerator 104, such as implementing a transpose layer in a CNN as described above.

Performing the interim operation 108 is inefficient, introducing latency in the neural network model run as well as occupying both the host processor 102 to perform the interim operation 108 and the accelerator 104 as the accelerator waits to continue the run. To address this issue, processing circuitry is configured to modify the neural network model 106 to eliminate the interim operation 108. This modification occurs after it is created (e.g., organized and trained), for example while the neural network model 106 is being prepared to operate with the accelerator 104 or during execution of the run. Thus, the modification does not alter results produce by the neural network model 106.

To remove the interim operation 108 (e.g., through a compiler of the neural network model 106 or otherwise), the processing circuitry—such as such as the machine 1300, the processor 102, the host system 408, the memory device 412, the HTP 700, the HTF 800, etc.—is configured to obtain (e.g., retrieve or receive) the neural network model 106. For example, the processor 102 may be installed into an automotive system to facilitate vehicle control, autonomous driving, etc. The processor 102 can be coupled to computer-media (e.g., solid state storage or the like) that holds the neural network model 106. Upon startup (e.g., boot up, initialization, etc.), the processor 102 retrieves the neural network model 106 from the computer-media and begins to run the neural network model 106, on a platform for the neural network model 106 or by itself if the neural network model 106 is executable. Other examples of obtaining the neural network model 106 can include a user providing the neural network model for compilation (e.g., for execution on the processor 102 or the accelerator 104), or the like.

The neural network model 106 includes matrices of synaptic weights arranged in several layers. While layers are common to many neural network models, some types may use other representations of weight. Here, the neural network model 106 uses matrices to represent weights between "neurons" in the neural network model 106.

Figure 2:
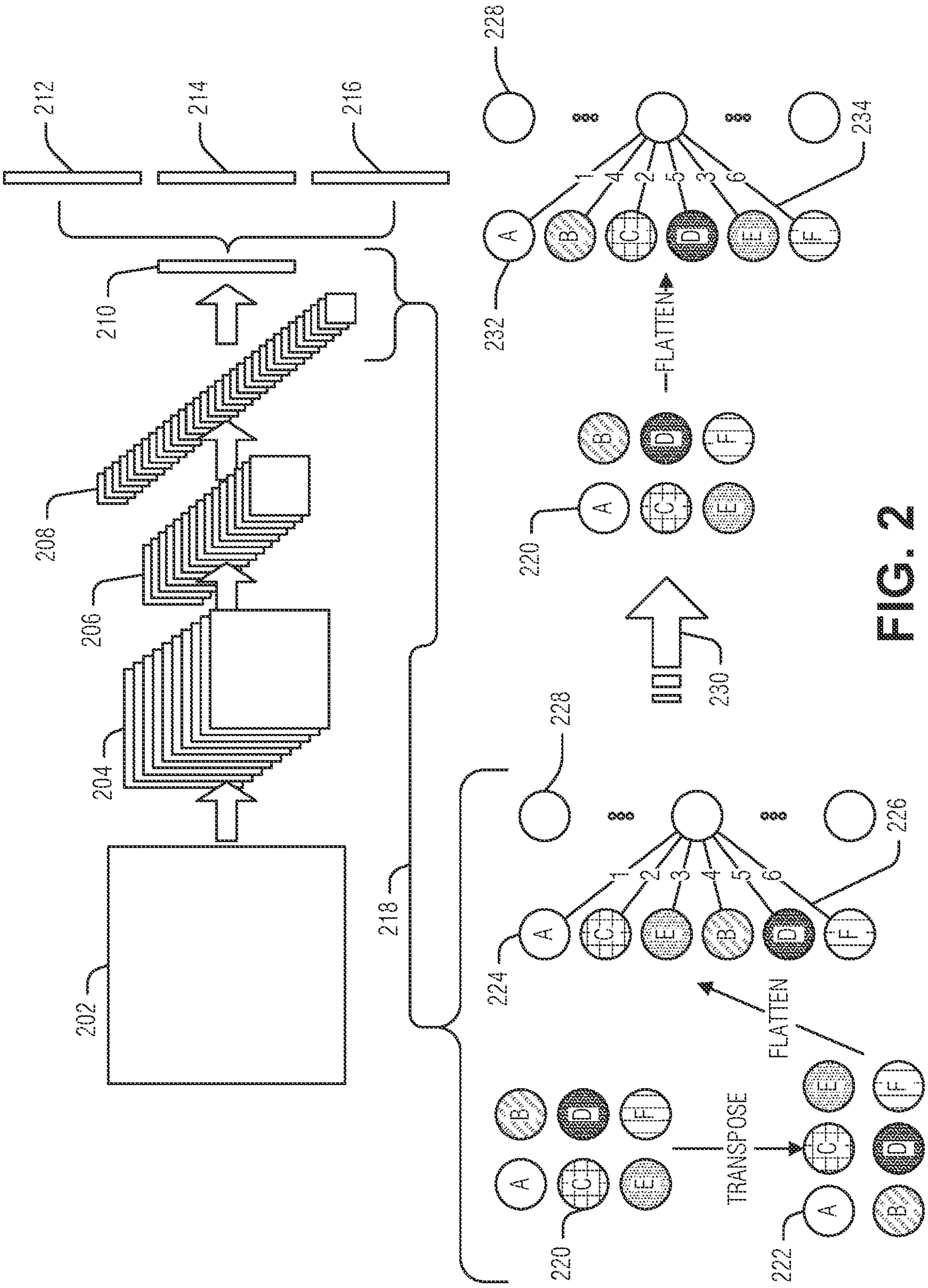
FIG. 2 illustrates an example of a convolutional neural network with a transpose layer and the removal of the transpose layer, according to an embodiment.

The processing circuitry is configured to detect a transposition of a matrix, in the matrices of synaptic weights, to a fully connected layer. The fully connected layer, or FC layer, is a layer of the neural network model 106 where each conceptual neural has a connection to each conceptual neuron in the subsequent layer. Thus, if the subsequent layer has five neurons, each neuron in the FC layer has at least five connections with at least one of these connections corresponding to each neuron in the subsequent layer. Some neural network representations do not actually have "neurons," instead simply tracking weights between conceptual neurons. In this case, the FC layer is embodied in the matrix, or other data structure, holding the weights between each conceptual neuron in the prior layer and subsequent layer. Regardless of the representation, the FC layer is a structure in the neural network model 106 such that a position of a given neuron in the prior layer can be moved to another position in the prior layer without changing the behavior of the neural network as long as the weights are moved such that connections weights between specific neurons, and not neuron positions, do not change. FIG. 2 illustrates this concept, where the neurons and connections are labeled. When the labeled neuron changes position, the corresponding connection is also moved such that the labeled neuron has the same connections to the subsequent layer neuron.

Detecting the matrix transposition to the FC layer involves finding FC layers in the neural network model 106. This can be accomplished by tabulating neuron-to-neuron connections between two layers. When each prior neuron has at least one connection to each subsequent neuron, then an FC layer is detected. Detecting the transpose can be accomplished by finding an instruction (e.g., command, direction, specification, etc.) in the neural network model 106 to transpose a matrix, or finding an implicit transpose, such as in a matrix of one dimension followed by a matrix in another dimension of the same values. In either case, the transpose imposes an operational burden on implementing system to transform the matrix from one set of dimensions into another. It is the detecting of this burden that identifies the transpose.

In an example, the FC layer is defined with respect to the detected matrix transpose. Thus, if multiple matrices are flattened, for example, to create one layer, and one of these matrices underwent a transposition prior to flattening, then only the neurons in that resultant flattened matrix need to be fully connected to the subsequent layer for the layer to be considered an FC layer. This occurs because, as long as the neurons under transpose are fully connected to a subsequent layer, even neurons from other matrices are not so fully connected, then rearranging those neurons does not affect the results of the neural network model 106 as long as corresponding weights are also rearranged.

The processing circuitry is configured to modify the neural network model 106 when the matrix transposition prior to a FC layer is detected. To create the modified neural network model, the fully connected layer values (e.g., synaptic weights) are changed to correspond to values in the matrix prior to the transposition. This change can be considered "moving the weights," however, in practice, the matrix positions holding the weights will likely be changed to represent the movement of the corresponding connections between neurons. FIG. 2 illustrates the movement of the labeled connections. However, it is likely the underlying matrix representing these connections has its values changed to represent this movement.

In an example, changing the fully connected layer values to correspond to values in the matrix prior to the transposition includes mapping a first position of the matrix to a second position in the fully connected layer under a flatten operation of the neural network model and moving a weight, of the fully connected layer, that corresponds to the first position to the second position. The flatten operation transforms a matrix into an array. For example, the flatten operation illustrated in FIG. 2 starts at the upper left and proceeds to the right down a row until the row end is met, placing each encountered value into the array of the FC layer. The operation then continues with the next row until all the values of the source matrix (e.g., matrix 222 or matrix 220) are placed in the array (e.g., array 224 or array 232). There are many different flattening operations that can be used. However, the nature of the flattening operation determines the placement of a given neuron in the destination array. This then dictates where to move the weights of the neurons when the source matrix is changed. When data structures other than a matrix are used, a similar updating of values, or the movement of objects, fields, etc., may be used to effectuate the movement of connections to correspond with the movement of neurons.

In an example, layers of the neural network model prior to the FC layer are convolutional neural network layers. CNNs tend to exhibit multidimensional connections due to their operation as noted above. Thus, a non-array matrix as input to the FC layer can be prevalent when the neural network model 106 implements a CNN, at least in part. In an example, the convolutional neural network layers were trained separately from layers subsequent to the fully connected layer. This situation can arise when parts of the CNN are wanted (e.g., for feature detection) but the desired output is different to the original CNN training. Because training can be a resource intensive process, reusing performant neural network models is desirable. However, because neural networks models follow connections through neurons, the structure of a model for reuse may involve a translation of connection position before it can be interfaced with other neural network structures. Here, the transposition can be a layer incorporated into the neural network model 106 to interface the convolutional neural layers to the subsequent layers. The Multi-Task Cascaded Convolutional Network (MTCNN) is an example of a neural network that is already trained and excels at facial recognition and bounding boxes of faces in images. Incorporating MCTNN can improve accuracy in these domains and eliminate the burdensome training involved in creating another neural network to perform the same tasks. However, in order to use the MCTNN in this manner, the structure of the MCTNN is not changed, resulting in, perhaps, suboptimal output neuron arrangements for various implementations.

In an example, moving the weight of the fully connected layer includes computing weights for a new convolution CONV2 of the fully connected layer—CONV2 has a first dimension of one and a second dimension of OUTSIZE—from an original convolution CONV1. An example of this computation is illustrated below, using nested FOR loops:

```
for c in range (NCHANNELS):
  for h in range (HEIGHT):
    for w in range (WIDTH):
      for j in range (OUTSIZE):
        i1 = c * HEIGHT * WIDTH + h * WIDTH + w;
        i2 = c * HEIGHT * WIDTH + w * WIDTH + h; and
        CONV2.weight[j][i1] = CONV1.weight[j][i2].
```

The variables 'c', 'h', 'w', and 'j' respectively store the value of NCHANNELS, HEIGHT, WIDTH, and OUTSIZE for each iteration of the loops. This structure adopts the flattening operation noted above; left-to-right, top-to-bottom. The variables at different levels of the loops can be changed to accommodate other structures, such as changing h to WIDTH and w to HEIGHT to effectuate a top-to-bottom, left-to-right flattening operation.

Once the FC layer values are changed, the processing circuitry is configured to eliminate the transposition from the neural network model to create the modified neural network model. The FC layer change effectively incorporates the transpose into the FC layer. Thus, the transpose is no longer necessary, and, if not removed, would result in an incorrect output of the neural network model 106. Removing the transpose eliminates the interim operation 108 from the run. Thus, the neural network model 106 can run on the accelerator 104 without transitioning to the processor 102, saving time and energy.

Once the modified neural network model is created, the modified neural network model can be used for inference—e.g., providing actionable results rather than training—on computer hardware, such as the processor 102 or accelerator 104. Accordingly, it is the modified neural network model that performs the neural network model run illustrated here in FIG. 1. When a compiler is used to create the modified neural network model, the output of the compiler can take the form of an installation package, an executable application, a loadable module, or a script to run on the computer hardware. These forms are generally targeted to the computer hardware (e.g., the accelerator 104). However, a compiler can also target an agnostic state that can be used across a variety of platforms.

In an example, the computer hardware conforms to a single instruction, multiple data (SIMD) architecture as the accelerator 104 is illustrated. Due to the nature of many artificial neural networks, SIMD devices tend to provide efficient processing of the neural network model 106. In an example, the computer hardware is a hybrid threading fabric (HTF) device (e.g., HTF 442 or HTF 800). In an example, the HTF is included in a memory device (e.g., CNM device 412 or memory device package 902) that also includes a hybrid threading processor (HTP) (e.g., HTP 440 or HTP 700), memory controller (e.g., memory controller 430, memory controller 500, or memory compute device chiplet 914), and memory. Additional details of these devices are provided below.

In an example, the compiler is a just-in-time (JIT) compiler, for example of the memory device. Thus, as noted above, the compiler may operate as part of preparing the neural network model 106 for the accelerator 104 (e.g., running on unrelated processing circuitry such as the machine 1300), or the compiler may be run in the target environment ecosystem (e.g., as JIT compiler). In the later example, the processing circuitry implementing the compiler can be hardware such as the host processor 102 (e.g., the machine 1300, the HTP 440 or HTP 700, or the like.)

The memory device configuration—such as the implementation represented by the memory device in accordance with the device 412—can be useful in many use cases. The efficiency of near-memory computation, in terms of power consumption, latency, or other use factors, enables neural networks to be used in many embedded applications. For example, the memory device can be configured to be included in a vehicle control system. The memory device can address control issues, such as processing sensor data or smoothing outputs to control the vehicle. In an example, the memory device is configured to interface with a camera of the vehicle, the camera designed to capture images as a vehicle operates. As these implementations generally attempt to achieve real-time performance with limited power budgets, fully using accelerators, by removing the transpose interim operation 108, improves performance of these embedded devices.

FIG. 2 illustrates an example of a CNN with a transpose layer and the removal of the transpose layer, according to an embodiment. As illustrated, an input layer 202 accepts input values, for example from an image or sensor. Following, or subsequent to, the input layer 202 are several convolutional layers, convolutional layer 204, convolutional layer 206, and convolutional layer 208. The convolutional layers convolving feature detectors over output from a previous layer. Typically, the features change with each convolutional layer, subsequent layers usually representing more sophisticated (e.g., complex) features than previous layers. For example, if the input layer 202 is encoding the sounds of a spoken dialogue, convolutional layer 204 can detect basic sound features (e.g., frequency, pitch, change in pitch, amplitude etc.), convolutional layer 206 can detect phonemes or words, and convolutional layer 208 can detect words, phrases, sentences, etc. Typically, the output of a given convolutional layer is multidimensional, with one dimension for each feature, a feature dimension encoding the presence of the feature across the input domain. Because features generally involve more than one input element, it is typical for the range of each dimension to be smaller than the input, illustrated by the smaller rectangles in FIG. 2.

The illustrated convolutional layers terminate in a single dimensional layer 210. The single dimensional layer 210 is illustrated as interfacing with output layer 212, output layer 214, and output layer 216. These output layers may be terminations of the neural network model, or input layers to subsequent neural networks that are not illustrated. Such an organization can be found in neural network models that incorporate previously trained neural networks, such as MTCNN. Other layers that are not illustrated may be included in the CNN. These layers contribute to the operation of the CNN but may not be conceptually required to achieve the purpose of the CNN. The transpose layer described herein is just such a layer.

The convolutional layer 208 and the single dimensional layer 210 are grouped as a FC layer 218. In accordance with the discussion in FIG. 1, the FC layer 218 is modified 230 to remove the transpose between matrix 220 and matrix 222. To facilitate clarity of the operation, the values being manipulated are labeled and shaded separately. If the transpose is not removed (e.g., an unmodified neural network model), the dimension of the matrix 220 is three by two (three rows of two columns) and the dimension of the matrix 222 is two by three. Once the matrix 220 is transposed to the matrix 222, the matrix 222 is flattened into the array 224 by starting at the upper left of the matrix 222 and proceeding left-to-right, top-to-bottom. The array 224 is fully connected to the array 228, forming the FC layer 218. The connections 226 between the elements in the array 224 are numbered, showing only the connections 226 to a single element in the array 228 for clarity, however, each element in the array 224 has a connection to each element in the array 228.

As described above with respect to FIG. 1, the change 230 to the neural network model includes rearranging the connections 234 between the array 232 and the array 228, and the removal of the transpose (e.g., the elimination of the matrix 222). Note that, when the matrix 222 is removed, the flattening occurs to the matrix 220. Using the same flattening operation (e.g., left-to-right, top-to-bottom), the arrangement of the elements is now different in the array 232. Thus, in order to have the same element connections (e.g., the weight of a connection between element B to the connected node of array 228), the connection is moved in the fully connected layer 218. Note, in the modified neural network model on the right, each element connection matches that of the unmodified neural network model on the left (e.g., element 'A' has connection '1', element 'B' has connection '4', and so on). Thus, from the perspective of subsequent layers, the operation of the modified neural network model is identical to the operation of the unmodified neural network model.

However, the removal of the transpose generally enables the modified neural network model to avoid costly calls outside of an accelerator to operate.

The following illustrates an example of these concepts. Consider that x is a four-dimensional matrix, for example, with dimensions (no. batches, 128, 3, 3), setting the batch size to ten. The following operations can be used:

x=x.transpose(3, 2) #transpose axis 2 with axis 3 x=x.flatten(1, −1) #matrix view is now (10, 1152)

x=x.Linear(1152, 256) #FC, output will be (10, 256)

Now consider the matrix x as an input matrix to the FC layer 218. The transpose and flatten result in a (10, 1152) input matrix. The output matrix is of shape (10, 256). There is an associated weight matrix w of shape (10, 1152, 256) used for the transformation. The FC layer 218 can be represented as follows:

```
BATCH_SIZE = 10
NCHANNELS = 128
HEIGHT = 3
WIDTH = 3
INSIZE = NCHANNELS * HEIGHT * WIDTH
OUTSIZE = 256
for b in range(BATCH_SIZE):
  for i in range(OUTSIZE):
    out[b][i] = 0.0
    for j in range(INSIZE):
      out[b][i] = out[b][i] + (in[b][j] * CONV1.weight[j][i])
```

The transpose operation on the input values prior to the FC layer rearranges the input data. To avoid the separate transpose and FC layers, the modified neural network model transposes the weights resulting in a single FC layer that is computationally equivalent to the original separate transpose+FC layers. Considering the above example, the following weight transformation can be used to transpose the weights (e.g., element or neuron connections). Using the original input shape coupled with the transpose parameters, weights can be computed a new convolution CONV2 from the original convolution CONV1 with the following:

```
for c in range(NCHANNELS):
  for h in range(HEIGHT):
    for w in range(WIDTH):
      for j in range(OUTSIZE):
        i1 = c * HEIGHT * WIDTH + h * WIDTH + w
        i2 = c * HEIGHT * WIDTH + w * WIDTH + h
        CONV2.weight[j][i1] = CONV1.weight[j][i2]
```

Because the FC weights are transposed following the same parameters specified in the original transpose layer, the same computations are now performed:

CONV2(original matrix)==CONV1(transposed matrix)

enabling the removal of the transpose operation. Although the example shown was with a height-width transposition, the approach can be generalized for any transpose axis.

Figure 3:
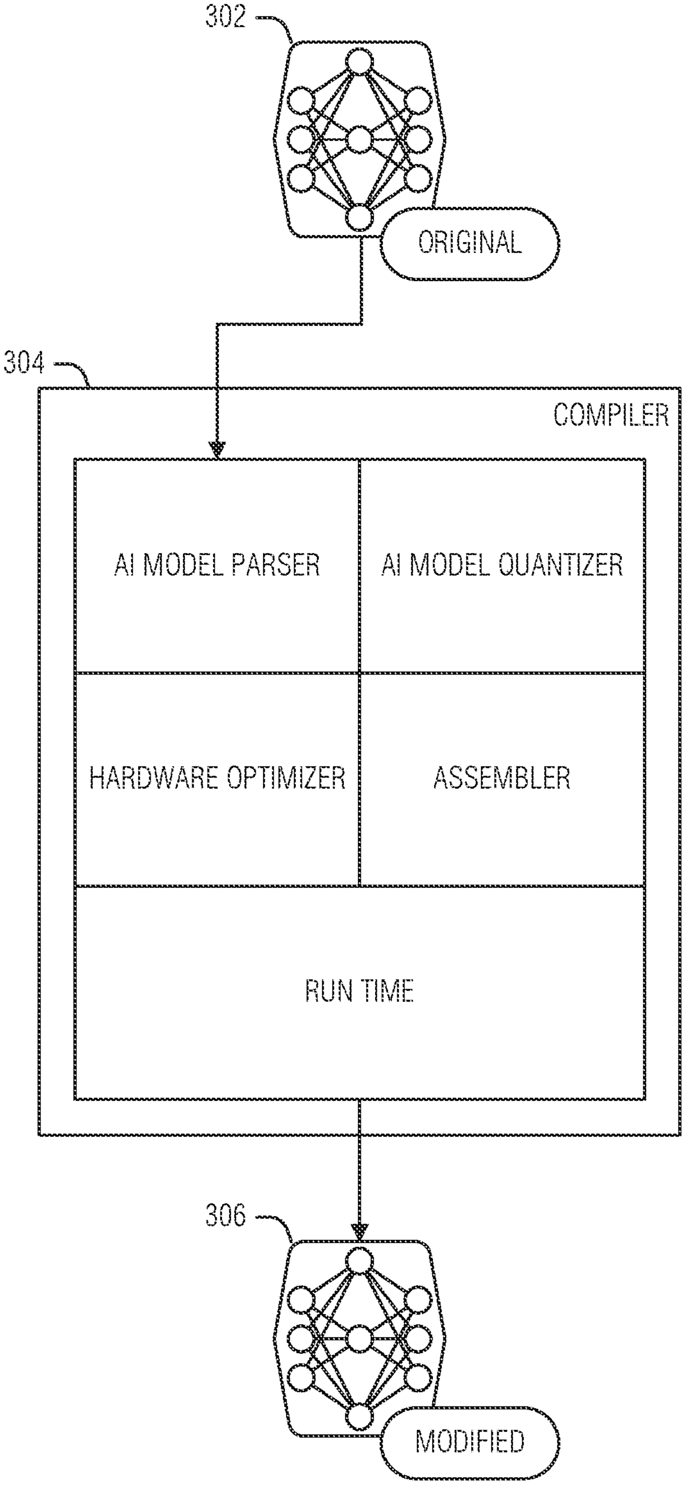
FIG. 3 illustrates an example of a compiler to identify and remove a transpose layer in a neural network, according to an embodiment.

FIG. 3 illustrates an example of a compiler 304 to identify and remove a transpose layer in a neural network 302, according to an embodiment. The compiler 304 is illustrated with several subcomponents, such as a parser, quantizer (e.g., to partition the parsed neural network model into discrete execution units), a hardware optimizer (e.g., to select which hardware units will perform which execution units, to adjust the execution units to run more efficiently, etc.), an assembler (e.g., to produce assembly instructions for target hardware), and a runtime (e.g., supporting software to enable the neural network model to run on the target hardware).

The compiler 304 can be standalone, invoked on the neural network model 302 to produce the modified neural network model 306. The modified neural network model 306, in this case, can be distributed as software, embedded in devices, etc. In an example, the compiler 304 runs on a system with the target hardware. In this example, the compiler 304 can be a JIT compiler. Here, the neural network model 302 is modified during runtime on the target hardware or system.

Figure 4:
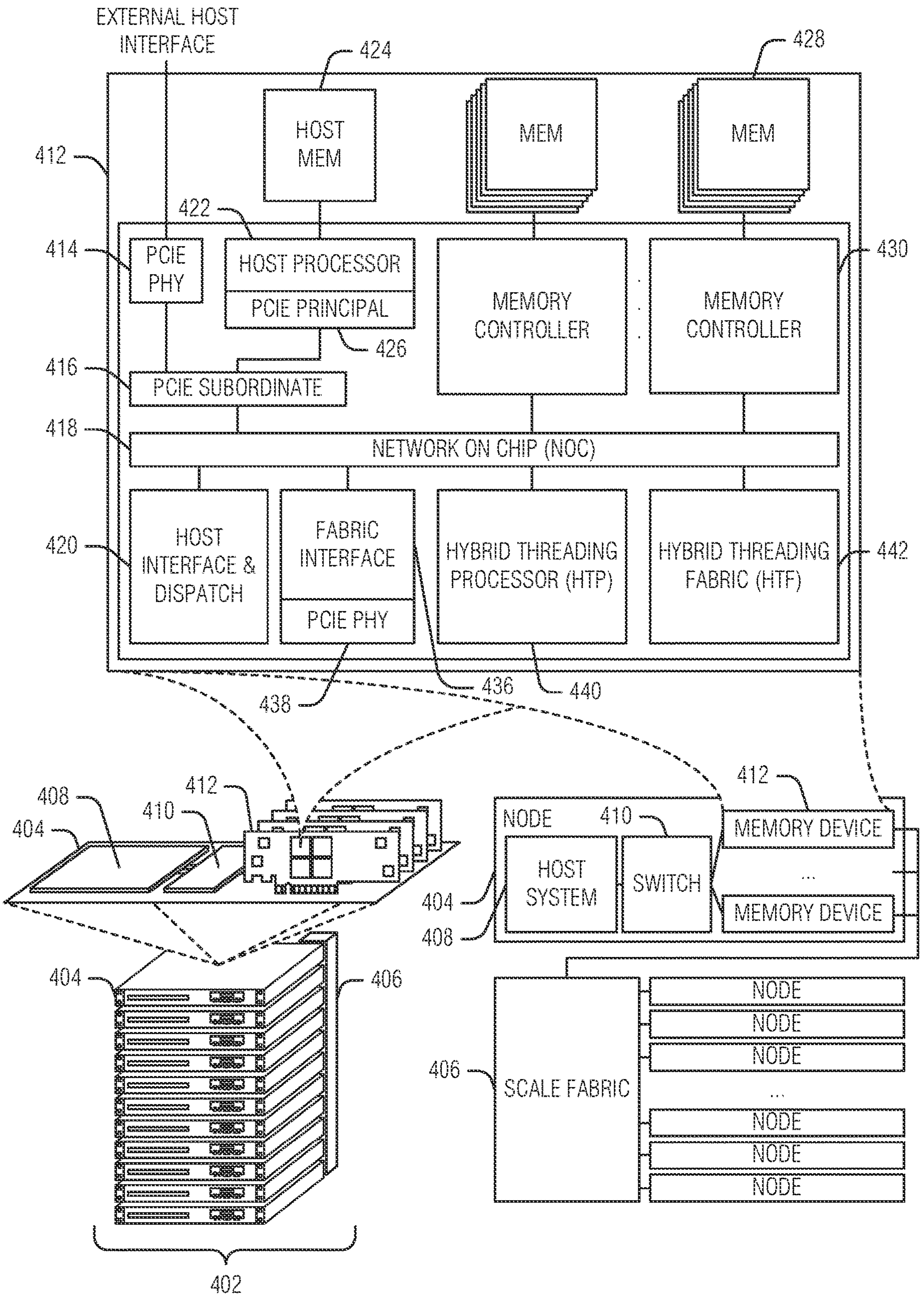
FIG. 4 illustrates generally a first example of a first memory-compute device in the context of a memory-compute system, according to an embodiment.

FIG. 4 illustrates generally a first example of a compute-near-memory system, or CNM system 402. The example of the CNM system 402 includes multiple different memory-compute nodes, such as can each include various compute-near-memory devices. Each node in the system can operate in its own operating system (OS) domain (e.g., Linux, among others). In an example, the nodes can exist collectively in a common OS domain of the CNM system 402.

In many ways, the CNM system 402 offers a good platform to implement the technique describer above with respect to FIG. 1. As expanded upon below and with respect to FIGS. 4-8, the processor 102 can be embodied in the host system 408 or the hybrid threading processor 440 and the SIMD accelerator 104 embodied in the hybrid threading fabric 442, for example. In fact, the CNM system 402 can provide a good balance in distributed processing resources to efficiently implement neural networks that is made more efficient by the neural network transpose layer removal described herein. When combined the CNM system 402 enables high performance implementations of practical neural network solutions to many problems.

The example of FIG. 4 includes an example of a first memory-compute node 404 of the CNM system 402. The CNM system 402 can have multiple nodes, such as including different instances of the first memory-compute node 404, that are coupled using a scale fabric 406. In an example, the architecture of the CNM system 402 can support scaling with up to n different memory-compute nodes (e.g., n=4096) using the scale fabric 406. As further discussed below, each node in the CNM system 402 can be an assembly of multiple devices.

The CNM system 402 can include a global controller for the various nodes in the system, or a particular memory-compute node in the system can optionally serve as a host or controller to one or multiple other memory-compute nodes in the same system. The various nodes in the CNM system 402 can thus be similarly or differently configured.

In an example, each node in the CNM system 402 can comprise a host system that uses a specified operating system. The operating system can be common or different among the various nodes in the CNM system 402. In the example of FIG. 4, the first memory-compute node 404 comprises a host system 408, a first switch 410, and a first memory-compute device 412. The host system 408 can comprise a processor, such as can include an X86, ARM, RISC-V, or other type of processor. The first switch 410 can be configured to facilitate communication between or among devices of the first memory-compute node 404 or of the CNM system 402, such as using a specialized or other communication protocol, generally referred to herein as a chip-to-chip protocol interface (CTCPI). That is, the CTCPI can include a specialized interface that is unique to the CNM system 402, or can include or use other interfaces such as the compute express link (CXL) interface, the peripheral component interconnect express (PCIe) interface, or the chiplet protocol interface (CPI), among others. The first switch 410 can include a switch configured to use the CTCPI. For example, the first switch 410 can include a CXL switch, a PCIe switch, a CPI switch, or other type of switch. In an example, the first switch 410 can be configured to couple differently configured endpoints. For example, the first switch 410 can be configured to convert packet formats, such as between PCIe and CPI formats, among others.

The CNM system 402 is described herein in various example configurations, such as comprising a system of nodes, and each node can comprise various chips (e.g., a processor, a switch, a memory device, etc.). In an example, the first memory-compute node 404 in the CNM system 402 can include various chips implemented using chiplets. In the below-discussed chiplet-based configuration of the CNM system 402, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 404 or the CNM system 402. The CPI can enable bridging from intra-chiplet networks to a broader chiplet network. For example, the Advanced eXtensible Interface (AXI) is a specification for intra-chip communications. AXI specifications, however, cover a variety of physical design options, such as the number of physical channels, signal timing, power, etc. Within a single chip, these options are generally selected to meet design goals, such as power consumption, speed, etc. However, to achieve the flexibility of a chiplet-based memory-compute system, an adapter, such as using CPI, can interface between the various AXI design options that can be implemented in the various chiplets. By enabling a physical channel-to-virtual channel mapping and encapsulating time-based signaling with a packetized protocol, CPI can be used to bridge intra-chiplet networks, such as within a particular memory-compute node, across a broader chiplet network, such as across the first memory-compute node 404 or across the CNM system 402.

The CNM system 402 is scalable to include multiple-node configurations. That is, multiple different instances of the first memory-compute node 404, or of other differently configured memory-compute nodes, can be coupled using the scale fabric 406, to provide a scaled system. Each of the memory-compute nodes can run its own operating system and can be configured to jointly coordinate system-wide resource usage.

In the example of FIG. 4, the first switch 410 of the first memory-compute node 404 is coupled to the scale fabric 406. The scale fabric 406 can provide a switch (e.g., a CTCPI switch, a PCIe switch, a CPI switch, or other switch) that can facilitate communication among and between different memory-compute nodes. In an example, the scale fabric 406 can help various nodes communicate in a partitioned global address space (PGAS).

In an example, the first switch 410 from the first memory-compute node 404 is coupled to one or multiple different memory-compute devices, such as including the first memory-compute device 412. The first memory-compute device 412 can comprise a chiplet-based architecture referred to herein as a compute-near-memory (CNM) chiplet. A packaged version of the first memory-compute device 412 can include, for example, one or multiple CNM chiplets. The chiplets can be communicatively coupled using CTCPI for high bandwidth and low latency.

In the example of FIG. 4, the first memory-compute device 412 can include a network on chip (NOC) or first NOC 418. Generally, a NOC is an interconnection network within a device, connecting a particular set of endpoints. In FIG. 4, the first NOC 418 can provide communications and connectivity between the various memory, compute resources, and ports of the first memory-compute device 412.

In an example, the first NOC 418 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 418 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches. The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participates in inter-chip communications can be set by an inter-chip bandwidth requirement.

The first NOC 418 can support various payloads (e.g., from 8 to 64-byte payloads; other payload sizes can similarly be used) between compute elements and memory. In an example, the first NOC 418 can be optimized for relatively smaller payloads (e.g., 8-16 bytes) to efficiently handle access to sparse data structures.

In an example, the first NOC 418 can be coupled to an external host via a first physical-layer interface 414, a PCIe subordinate module 416 or endpoint, and a PCIe principal module 426 or root port. That is, the first physical-layer interface 414 can include an interface to allow an external host processor to be coupled to the first memory-compute device 412. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 418 in the first memory-compute device 412, and the first switch 410 can include a CTCPI switch. The CTCPI switch can allow CTCPI packets to be transferred from a source memory-compute device, such as the first memory-compute device 412, to a different, destination memory-compute device (e.g., on the same or other node), such as without being converted to another packet format.

In an example, the first memory-compute device 412 can include an internal host processor 422. The internal host processor 422 can be configured to communicate with the first NOC 418 or other components or modules of the first memory-compute device 412, for example, using the internal PCIe principal module 426, which can help eliminate a physical layer that would consume time and energy. In an example, the internal host processor 422 can be based on a RISC-V ISA processor, and can use the first physical-layer interface 414 to communicate outside of the first memory-compute device 412, such as to other storage, networking, or other peripherals to the first memory-compute device 412. The internal host processor 422 can control the first memory-compute device 412 and can act as a proxy for operating system-related functionality. The internal host processor 422 can include a relatively small number of processing cores (e.g., 2-4 cores) and a host memory device 424 (e.g., comprising a DRAM module).

In an example, the internal host processor 422 can include PCI root ports. When the internal host processor 422 is in use, then one of its root ports can be connected to the PCIe subordinate module 416. Another of the root ports of the internal host processor 422 can be connected to the first physical-layer interface 414, such as to provide communication with external PCI peripherals. When the internal host processor 422 is disabled, then the PCIe subordinate module 416 can be coupled to the first physical-layer interface 414 to allow an external host processor to communicate with the first NOC 418. In an example of a system with multiple memory-compute devices, the first memory-compute device 412 can be configured to act as a system host or controller. In this example, the internal host processor 422 can be in use, and other instances of internal host processors in the respective other memory-compute devices can be disabled.

The internal host processor 422 can be configured at power-up of the first memory-compute device 412, such as to allow the host to initialize. In an example, the internal host processor 422 and its associated data paths (e.g., including the first physical-layer interface 414, the PCIe subordinate module 416, etc.) can be configured from input pins to the first memory-compute device 412. One or more of the pins can be used to enable or disable the internal host processor 422 and configure the PCI (or other) data paths accordingly.

In an example, the first NOC 418 can be coupled to the scale fabric 406 via a scale fabric interface module 436 and a second physical-layer interface 438. The scale fabric interface module 436, or SIF, can facilitate communication between the first memory-compute device 412 and a device space, such as a partitioned global address space (PGAS). The PGAS can be configured such that a particular memory-compute device, such as the first memory-compute device 412, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 406 can be configured to support various packet formats. In an example, the scale fabric 406 supports orderless packet communications, or supports ordered packets such as can use a path identifier to spread bandwidth across multiple equivalent paths. The scale fabric 406 can generally support remote operations such as remote memory read, write, and other built-in atomics, remote memory atomics, remote memory-compute device send events, and remote memory-compute device call and return operations.

In an example, the first NOC 418 can be coupled to one or multiple different memory modules, such as including a first memory device 428. The first memory device 428 can include various kinds of memory devices, for example, LPDDR5 or GDDR6, among others. In the example of FIG. 4, the first NOC 418 can coordinate communications with the first memory device 428 via a memory controller 430 that can be dedicated to the particular memory module. In an example, the memory controller 430 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising SRAM memory side cache), thereby allowing back-to-back atomic operations using the same memory location, with minimal throughput degradation.

The memory module cache can provide storage for frequently accessed memory locations, such as without having to re-access the first memory device 428. In an example, the memory module cache can be configured to cache data only for a particular instance of the memory controller 430. In an example, the memory controller 430 includes a DRAM controller configured to interface with the first memory device 428, such as including DRAM devices. The memory controller 430 can provide access scheduling and bit error management, among other functions.

In an example, the first NOC 418 can be coupled to a hybrid threading processor (HTP 440), a hybrid threading fabric (HTF 442) and a host interface and dispatch module (HIF 420). The HIF 420 can be configured to facilitate access to host-based command request queues and response queues. In an example, the HIF 420 can dispatch new threads of execution on processor or compute elements of the HTP 440 or the HTF 442. In an example, the HIF 420 can be configured to maintain workload balance across the HTP 440 module and the HTF 442 module.

The hybrid threading processor, or HTP 440, can include an accelerator, such as can be based on a RISC-V instruction set. The HTP 440 can include a highly threaded, event-driven processor in which threads can be executed in single instruction rotation, such as to maintain high instruction throughput. The HTP 440 comprises relatively few custom instructions to support low-overhead threading capabilities, event send/receive, and shared memory atomic operators.

The hybrid threading fabric, or HTF 442, can include an accelerator, such as can include a non-von Neumann, coarse-grained, reconfigurable processor. The HTF 442 can be optimized for high-level language operations and data types (e.g., integer or floating point). In an example, the HTF 442 can support data flow computing. The HTF 442 can be configured to use substantially all of the memory bandwidth available on the first memory-compute device 412, such as when executing memory-bound compute kernels.

The HTP and HTF accelerators of the CNM system 402 can be programmed using various high-level, structured programming languages. For example, the HTP and HTF accelerators can be programmed using C/C++, such as using the LLVM compiler framework. The HTP accelerator can leverage an open source compiler environment, such as with various added custom instruction sets configured to improve memory access efficiency, provide a message passing mechanism, and manage events, among other things. In an example, the HTF accelerator can be designed to enable programming of the HTF 442 using a high-level programming language, and the compiler can generate a simulator configuration file or a binary file that runs on the HTF 442 hardware. The HTF 442 can provide a mid-level language for expressing algorithms precisely and concisely, while hiding configuration details of the HTF accelerator itself. In an example, the HTF accelerator tool chain can use an LLVM front-end compiler and the LLVM intermediate representation (IR) to interface with an HTF accelerator back end.

Figure 5:
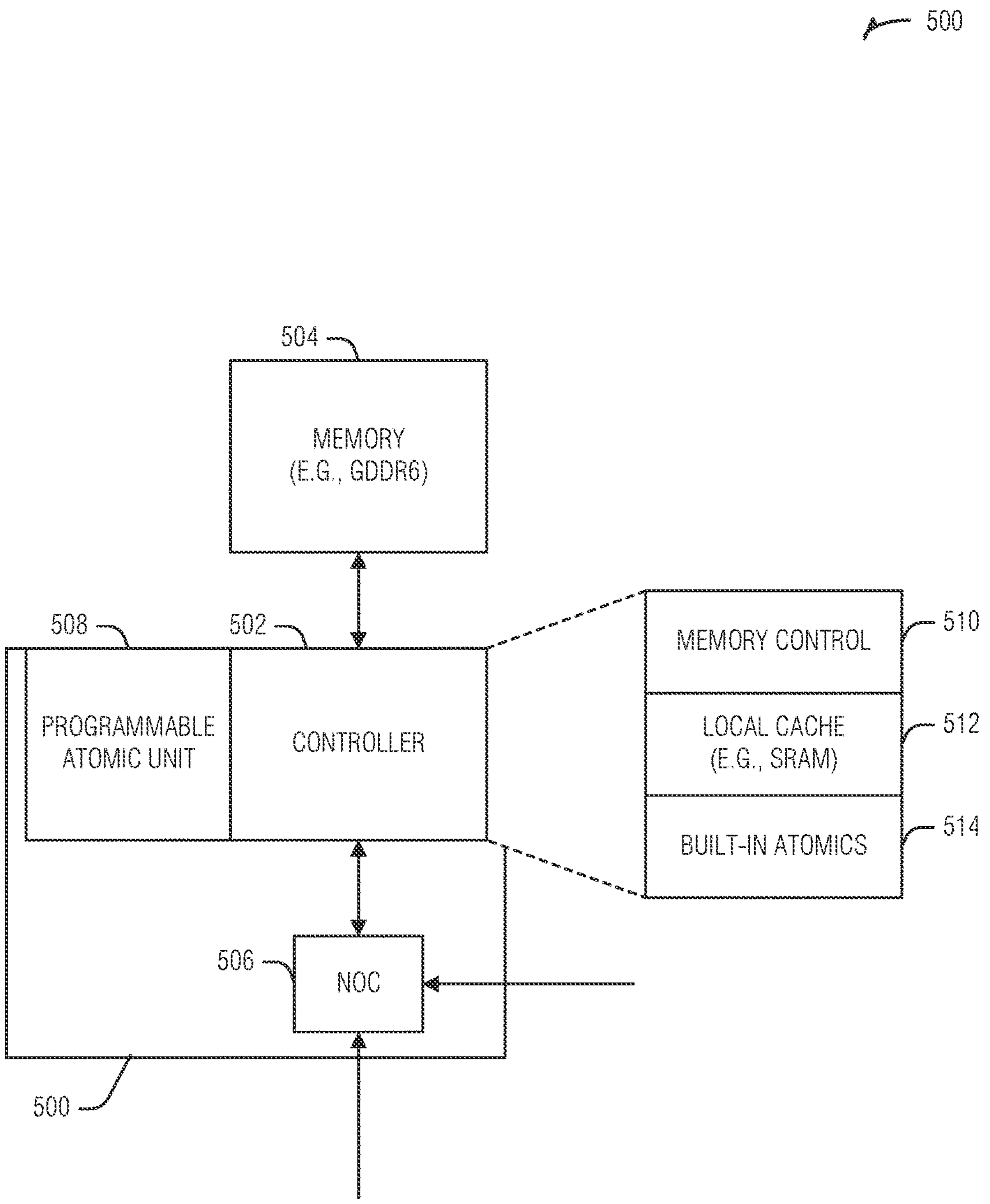
FIG. 5 illustrates generally an example of a memory subsystem of a memory-compute device, according to an embodiment.

FIG. 5 illustrates generally an example of a memory subsystem 500 of a memory-compute device, according to an embodiment. The example of the memory subsystem 500 includes a controller 502, a programmable atomic unit 508, and a second NOC 506. The controller 502 can include or use the programmable atomic unit 508 to carry out operations using information in a memory device 504. In an example, the memory subsystem 500 comprises a portion of the first memory-compute device 412 from the example of FIG. 4, such as including portions of the first NOC 418 or of the memory controller 430.

In the example of FIG. 5, the second NOC 506 is coupled to the controller 502 and the controller 502 can include a memory control module 510, a local cache module 512, and a built-in atomics module 514. In an example, the built-in atomics module 514 can be configured to handle relatively simple, single-cycle, integer atomics. The built-in atomics module 514 can perform atomics at the same throughput as, for example, normal memory read or write operations. In an example, an atomic memory operation can include a combination of storing data to the memory, performing an atomic memory operation, and then responding with load data from the memory.

The local cache module 512, such as can include an SRAM cache, can be provided to help reduce latency for repetitively-accessed memory locations. In an example, the local cache module 512 can provide a read buffer for sub-memory line accesses. The local cache module 512 can be particularly beneficial for compute elements that have relatively small or no data caches.

The memory control module 510, such as can include a DRAM controller, can provide low-level request buffering and scheduling, such as to provide efficient access to the memory device 504, such as can include a DRAM device. In an example, the memory device 504 can include or use a GDDR6 DRAM device, such as having 16 Gb density and 64 Gb/sec peak bandwidth. Other devices can similarly be used.

In an example, the programmable atomic unit 508 can comprise single-cycle or multiple-cycle operator such as can be configured to perform integer addition or more complicated multiple-instruction operations such as bloom filter insert. In an example, the programmable atomic unit 508 can be configured to perform load and store-to-memory operations. The programmable atomic unit 508 can be configured to leverage the RISC-V ISA with a set of specialized instructions to facilitate interactions with the controller 502 to atomically perform user-defined operations.

Programmable atomic requests, such as received from an on-node or off-node host, can be routed to the programmable atomic unit 508 via the second NOC 506 and the controller 502. In an example, custom atomic operations (e.g., carried out by the programmable atomic unit 508) can be identical to built-in atomic operations (e.g., carried out by the built-in atomics module 514) except that a programmable atomic operation can be defined or programmed by the user rather than the system architect. In an example, programmable atomic request packets can be sent through the second NOC 506 to the controller 502, and the controller 502 can identify the request as a custom atomic. The controller 502 can then forward the identified request to the programmable atomic unit 508.

Figure 6:
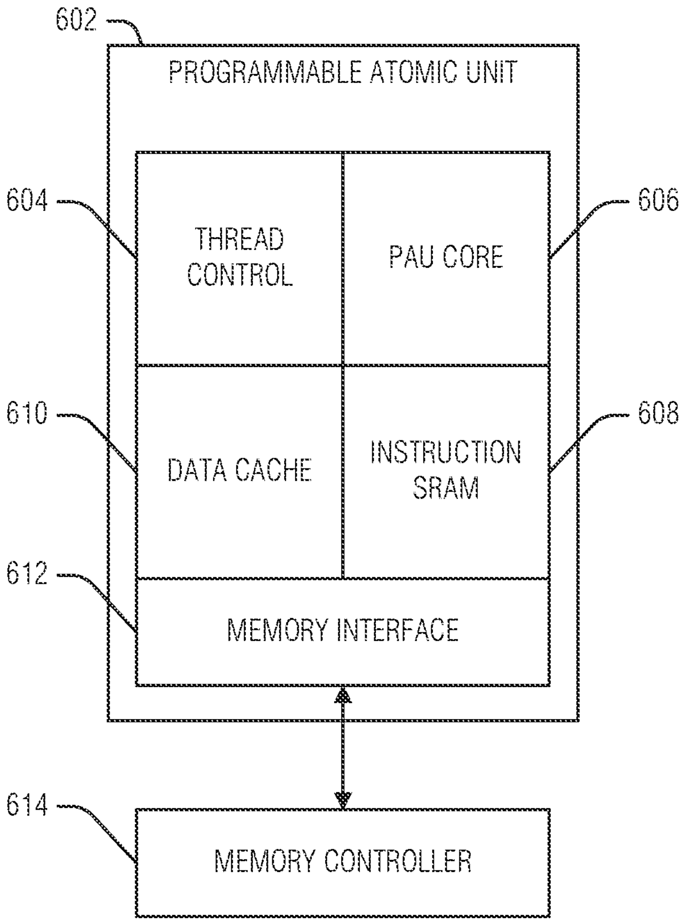
FIG. 6 illustrates generally an example of a programmable atomic unit for a memory controller, according to an embodiment.

FIG. 6 illustrates generally an example of a programmable atomic unit 602 for use with a memory controller, according to an embodiment. In an example, the programmable atomic unit 602 can comprise or correspond to the programmable atomic unit 508 from the example of FIG. 5. That is, FIG. 6 illustrates components in an example of a programmable atomic unit 602 (PAU), such as those noted above with respect to FIG. 5 (e.g., in the programmable atomic unit 508), or to FIG. 4 (e.g., in an atomic operations module of the memory controller 430). As illustrated in FIG. 6, the programmable atomic unit 602 includes a PAU processor or PAU core 606, a PAU thread control 604, an instruction SRAM 608, a data cache 610, and a memory interface 612 to interface with the memory controller 614. In an example, the memory controller 614 comprises an example of the controller 502 from the example of FIG. 5.

In an example, the PAU core 606 is a pipelined processor such that multiple stages of different instructions are executed together per clock cycle. The PAU core 606 can include a barrel-multithreaded processor, with thread control 604 circuitry to switch between different register files (e.g., sets of registers containing current processing state) upon each clock cycle. This enables efficient context switching between currently executing threads. In an example, the PAU core 606 supports eight threads, resulting in eight register files. In an example, some or all of the register files are not integrated into the PAU core 606, but rather reside in a local data cache 610 or the instruction SRAM 608. This reduces circuit complexity in the PAU core 606 by eliminating the traditional flip-flops used for registers in such memories.

The local PAU memory can include instruction SRAM 608, such as can include instructions for various atomics. The instructions comprise sets of instructions to support various application-loaded atomic operators. When an atomic operator is requested, such as by an application chiplet, a set of instructions corresponding to the atomic operator are executed by the PAU core 606. In an example, the instruction SRAM 608 can be partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the programmable atomic unit 602. Other metadata for the programmable instructions can be stored in memory (e.g., in partition tables) in memory local to the programmable atomic unit 602.

In an example, atomic operators manipulate the data cache 610, which is generally synchronized (e.g., flushed) when a thread for an atomic operator completes. Thus, aside from initial loading from the external memory, such as from the memory controller 614, latency can be reduced for most memory operations during execution of a programmable atomic operator thread.

A pipelined processor, such as the PAU core 606, can experience an issue when an executing thread attempts to issue a memory request if an underlying hazard condition would prevent such a request. Here, the memory request is to retrieve data from the memory controller 614, whether it be from a cache on the memory controller 614 or off-die memory. To resolve this issue, the PAU core 606 is configured to deny the memory request for a thread. Generally, the PAU core 606 or the thread control 604 can include circuitry to enable one or more thread rescheduling points in the pipeline. Here, the denial occurs at a point in the pipeline that is beyond (e.g., after) these thread rescheduling points. In an example, the hazard occurred beyond the rescheduling point. Here, a preceding instruction in the thread created the hazard after the memory request instruction passed the last thread rescheduling point prior to the pipeline stage in which the memory request could be made.

In an example, to deny the memory request, the PAU core 606 is configured to determine (e.g., detect) that there is a hazard on memory indicated in the memory request. Here, hazard denotes any condition such that allowing (e.g., performing) the memory request will result in an inconsistent state for the thread. In an example, the hazard is an in-flight memory request. Here, whether or not the data cache 610 includes data for the requested memory address, the presence of the in-flight memory request makes it uncertain what the data in the data cache 610 at that address should be. Thus, the thread must wait for the in-flight memory request to be completed to operate on current data. The hazard is cleared when the memory request completes.

In an example, the hazard is a dirty cache line in the data cache 610 for the requested memory address. Although the dirty cache line generally indicates that the data in the cache is current and the memory controller version of this data is not, an issue can arise on thread instructions that do not operate from the cache. An example of such an instruction uses a built-in atomic operator, or other separate hardware block, of the memory controller 614. In the context of a memory controller, the built-in atomic operators can be separate from the programmable atomic unit 602 and do not have access to the data cache 610 or instruction SRAM 608 inside the PAU. If the cache line is dirty, then the built-in atomic operator will not be operating on the most current data until the data cache 610 is flushed to synchronize the cache and the other or off-die memories. This same situation could occur with other hardware blocks of the memory controller, such as cryptography block, encoder, etc.

Figure 7:
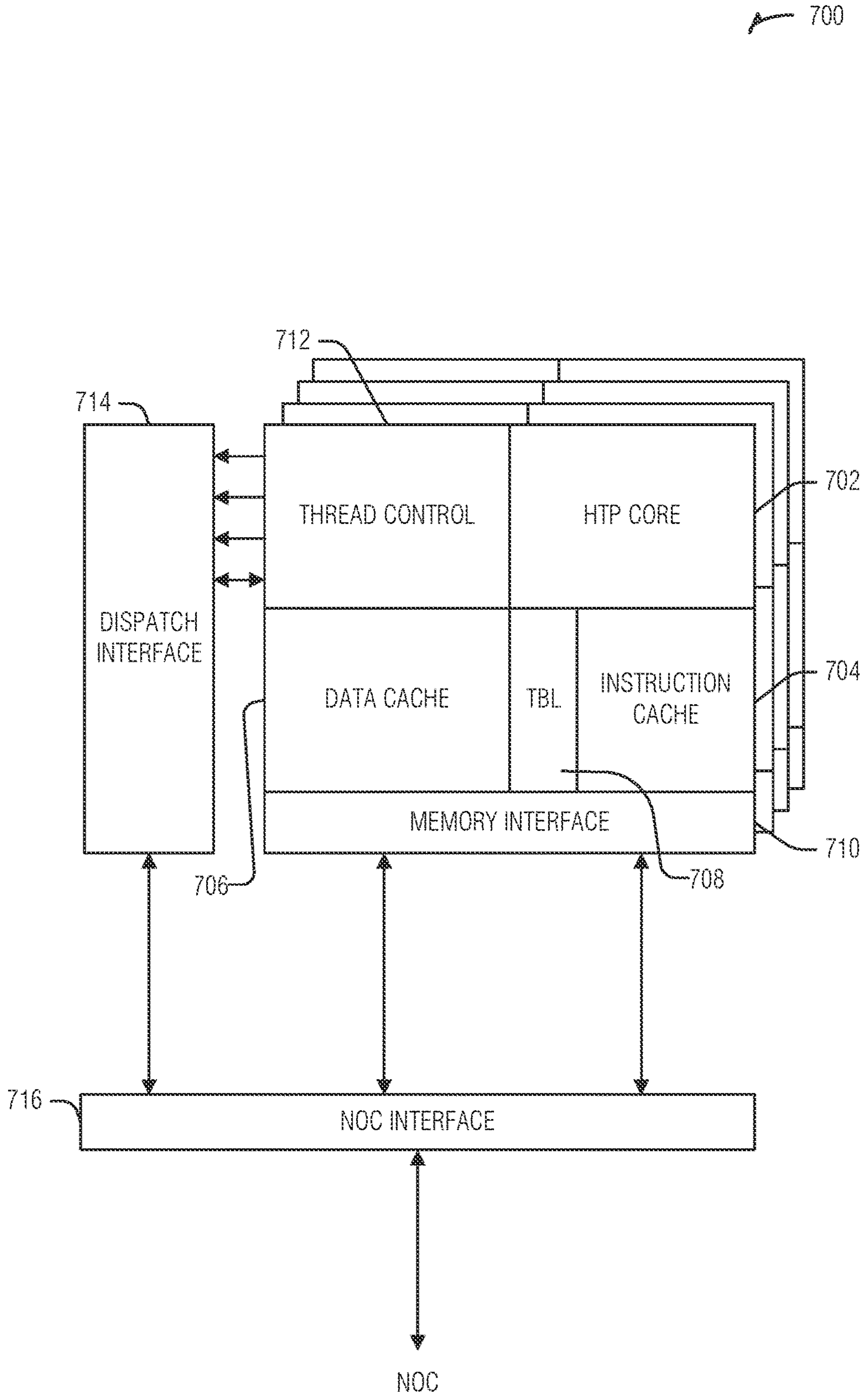
FIG. 7 illustrates an example of a hybrid threading processor (HTP) accelerator of a memory-compute device, according to an embodiment.

FIG. 7 illustrates an example of a hybrid threading processor (HTP) accelerator, or HTP accelerator 700. The HTP accelerator 700 can comprise a portion of a memory-compute device, according to an embodiment. In an example, the HTP accelerator 700 can include or comprise the HTP 440 from the example of FIG. 4. The HTP accelerator 700 includes, for example, a HTP core 702, an instruction cache 704, a data cache 706, a translation block 708, a memory interface 710, and a thread controller 712. The HTP accelerator 700 can further include a dispatch interface 714 and a NOC interface 716, such as for interfacing with a NOC such as the first NOC 418 from the example of FIG. 4, the second NOC 506 from the example of FIG. 5, or other NOC.

In an example, the HTP accelerator 700 includes a module that is based on a RISC-V instruction set and can include a relatively small number of other or additional custom instructions to support a low-overhead, threading-capable Hybrid Threading (HT) language. The HTP accelerator 700 can include a highly-threaded processor core, the HTP core 702, in which, or with which, threads can be executed in a single instruction rotation, such as to maintain high instruction throughput. In an example, a thread can be paused when it waits for other, pending events to complete. This can allow the compute resources to be efficiently used on relevant work instead of polling. In an example, multiple-thread barrier synchronization can use efficient HTP-to-HTP and HTP-to/from-Host messaging, such as can allow thousands of threads to initialize or wake in, for example, tens of clock cycles.

In an example, the dispatch interface 714 can comprise a functional block of the HTP accelerator 700 for handling hardware-based thread management. That is, the dispatch interface 714 can manage dispatch of work to the HTP core

702 or other accelerators. Non-HTP accelerators, however, are generally not able to dispatch work. In an example, work dispatched from a host can use dispatch queues that reside in, e.g., host main memory (e.g., DRAM-based memory). Work dispatched from the HTP accelerator 700, on the other hand, can use dispatch queues that reside in SRAM, such as within the dispatches for the target HTP accelerator 700 within a particular node.

In an example, the HTP core 702 can comprise one or more cores that execute instructions on behalf of threads. That is, the HTP core 702 can include an instruction processing block. The HTP core 702 can further include, or can be coupled to, the thread controller 712. The thread controller 712 can provide thread control and state for each active thread within the HTP core 702. The data cache 706 can include cache for a host processor (e.g., for local and remote memory-compute devices, including for the HTP core 702), and the instruction cache 704 can include cache for use by the HTP core 702. In an example, the data cache 706 can be configured for read and write operations, and the instruction cache 704 can be configured for read only operations.

In an example, the data cache 706 is a small cache provided per hardware thread. The data cache 706 can temporarily store data for use by the owning thread. The data cache 706 can be managed by hardware or software in the HTP accelerator 700. For example, hardware can be configured to automatically allocate or evict lines as needed, as load and store operations are executed by the HTP core 702. Software, such as using RISC-V instructions, can determine which memory accesses should be cached, and when lines should be invalidated or written back to other memory locations.

Data caching on the HTP accelerator 700 has various benefits, including making larger accesses more efficient for the memory controller, allowing an executing thread to avoid stalling. However, there are situations when using the cache causes inefficiencies. An example includes accesses where data is accessed only once and causes thrashing of the cache lines. To help address this problem, the HTP accelerator 700 can use a set of custom load instructions to force a load instruction to check for a cache hit, and on a cache miss to issue a memory request for the requested operand and not put the obtained data in the data cache 706. The HTP accelerator 700 thus includes various different types of load instructions, including non-cached and cache line loads. The non-cached load instructions use the cached data if dirty data is present in the cache. The non-cached load instructions ignore clean data in the cache, and do not write accessed data to the data cache. For cache line load instructions, the complete data cache line (e.g., comprising 64 bytes) can be loaded from memory into the data cache 706, and can load the addressed memory into a specified register. These loads can use the cached data if clean or dirty data is in the data cache 706. If the referenced memory location is not in the data cache 706, then the entire cache line can be accessed from memory. Use of the cache line load instructions can reduce cache misses when sequential memory locations are being referenced (such as memory copy operations) but can also waste memory and bandwidth at the NOC interface 716 if the referenced memory data is not used.

In an example, the HTP accelerator 700 includes a custom store instruction that is non-cached. The non-cached store instruction can help avoid thrashing the data cache 706 with write data that is not sequentially written to memory.

In an example, the HTP accelerator 700 further includes a translation block 708. The translation block 708 can include a virtual-to-physical translation block for local memory of a memory-compute device. For example, a host processor, such as in the HTP core 702, can execute a load or store instruction, and the instruction can generate a virtual address. The virtual address can be translated to a physical address of the host processor, such as using a translation table from the translation block 708. The memory interface 710, for example, can include an interface between the HTP core 702 and the NOC interface 716.

Figure 8:
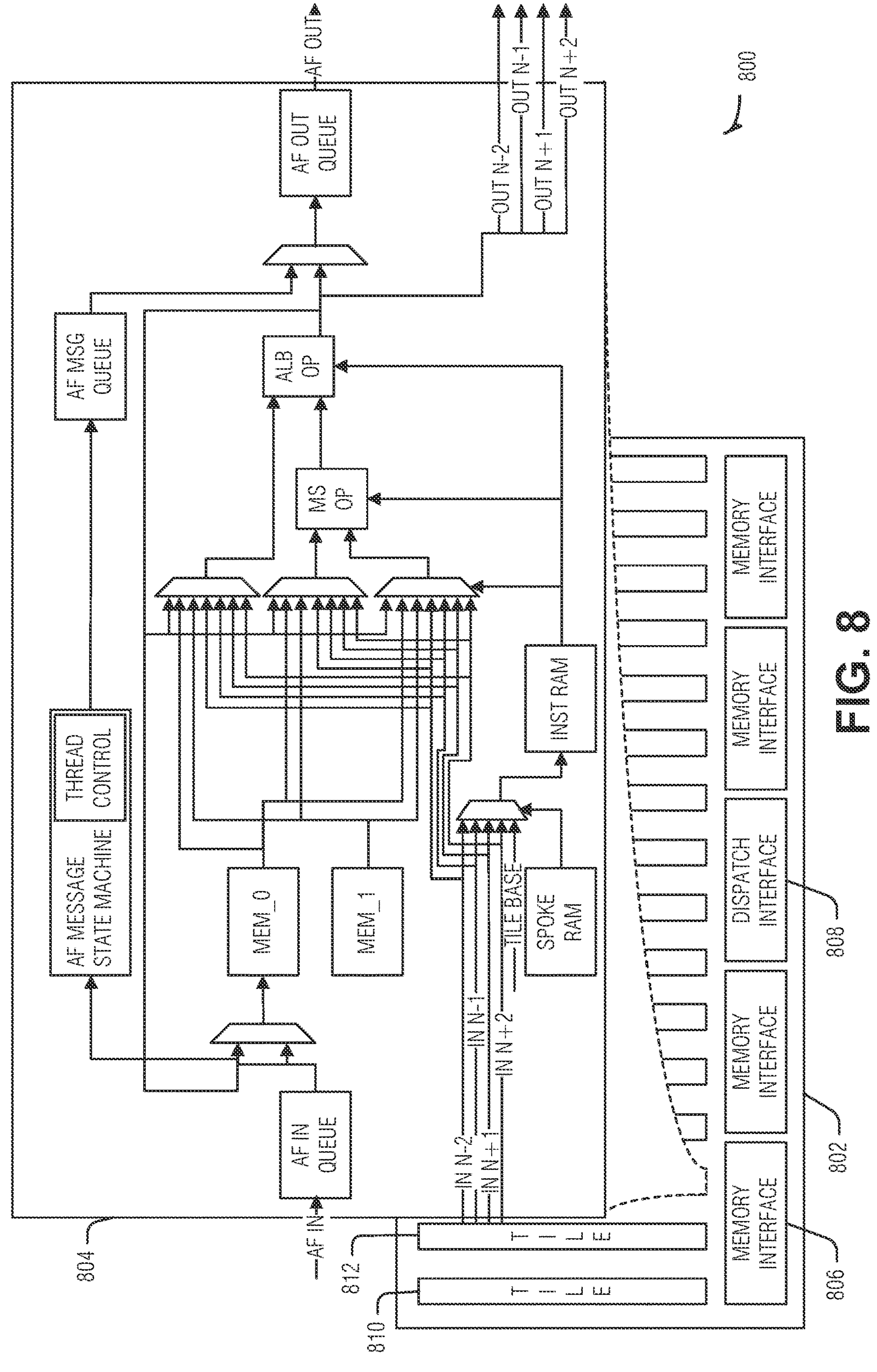
FIG. 8 illustrates an example of a representation of a hybrid threading fabric (HTF) of a memory-compute device, according to an embodiment.

FIG. 8 illustrates an example of a representation of a hybrid threading fabric (HTF), or HTF 800, of a memory-compute device, according to an embodiment. In an example, the HTF 800 can include or comprise the HTF 442 from the example of FIG. 4. The HTF 800 is a coarse-grained, reconfigurable compute fabric that can be optimized for high-level language operand types and operators (e.g., using C/C++ or other high-level language). In an example, the HTF 800 can include configurable, n-bit wide (e.g., 512-bit wide) data paths that interconnect hardened SIMD arithmetic units.

In an example, the HTF 800 comprises an HTF cluster 802 that includes multiple HTF tiles, including an example tile 804, or Tile N. Each HTF tile can include one or more compute elements with local memory and arithmetic functions. For example, each tile can include a compute pipeline with support for integer and floating-point operations. In an example, the data path, compute elements, and other infrastructure can be implemented as hardened IP to provide maximum performance while minimizing power consumption and reconfiguration time.

In the example of FIG. 8, the tiles comprising the HTF cluster 802 are linearly arranged, and each tile in the cluster can be coupled to one or multiple other tiles in the HTF cluster 802. In the example of FIG. 8, the example tile 804, or Tile N, is coupled to four other tiles, including to a base tile 810 (e.g., Tile N−2) via the port labeled SF IN N−2, to an adjacent tile 812 (e.g., Tile N−1) via the port labeled SF IN N−1, and to a Tile N+1 via the port labeled SF IN N+1 and to a Tile N+2 via the port labeled SF IN N+2. The example tile 804 can be coupled to the same or other tiles via respective output ports, such as those labeled SF OUT N−1, SF OUT N−2, SF OUT N+1, and SF OUT N+2. In this example, the ordered list of names for the various tiles are notional indications of the positions of the tiles. In other examples, the tiles comprising the HTF cluster 802 can be arranged in a grid or other configuration, with each tile similarly coupled to one or several of its nearest neighbors in the grid. Tiles that are provided at an edge of a cluster can optionally have fewer connections to neighboring tiles. For example, Tile N−2, or the base tile 810 in the example of FIG. 8, can be coupled only to the adjacent tile 812 (Tile N−1) and to the example tile 804 (Tile N). Fewer or additional inter-tile connections can similarly be used.

The HTF cluster 802 can further include memory interface modules, including a first memory interface module 806. The memory interface modules can couple the HTF cluster 802 to a NOC, such as the first NOC 418. In an example, the memory interface modules can allow tiles within a cluster to make requests to other locations in a memory-compute system, such as in the same or different node in the system. That is, the representation of the HTF 800 can comprise a portion of a larger fabric that can be distributed across multiple nodes, such as with one or more HTF tiles or HTF clusters at each of the nodes. Requests can be made between tiles or nodes within the context of the larger fabric.

In the example of FIG. 8, the tiles in the HTF cluster 802 are coupled using a synchronous fabric (SF). The synchronous fabric can provide communication between a particular tile and its neighboring tiles in the HTF cluster 802, as described above. Each HTF cluster 802 can further include an asynchronous fabric (AF) that can provide communication among, e.g., the tiles in the cluster, the memory interfaces in the cluster, and a dispatch interface 808 in the cluster.

In an example, the synchronous fabric can exchange messages that include data and control information. The control information can include, among other things, instruction RAM address information or a thread identifier. The control information can be used to set up a data path, and a data message field can be selected as a source for the path. Generally, the control fields can be provided or received earlier, such that they can be used to configure the data path. For example, to help minimize any delay through the synchronous domain pipeline in a tile, the control information can arrive at a tile a few clock cycles before the data field. Various registers can be provided to help coordinate dataflow timing in the pipeline.

In an example, each tile in the HTF cluster 802 can include multiple memories. Each memory can have the same width as the data path (e.g., 512 bits) and can have a specified depth, such as in a range of 512 to 1024 elements. The tile memories can be used to store data that supports data path operations. The stored data can include constants loaded as part of a kernel's cluster configuration, for example, or can include variables calculated as part of the data flow. In an example, the tile memories can be written from the asynchronous fabric as a data transfer from another synchronous domain or can include a result of a load operation such as initiated by another synchronous domain. The tile memory can be read via synchronous data path instruction execution in the synchronous domain.

In an example, each tile in an HTF cluster 802 can have a dedicated instruction RAM (INST RAM). In an example of an HTF cluster 802 with sixteen tiles, and instruction RAM instances with sixty-four entries, the cluster can allow algorithms to be mapped with up to 1024 multiply-shift and/or ALU operations. The various tiles can optionally be pipelined together, such as using the synchronous fabric, to allow data flow compute with minimal memory access, thus minimizing latency and reducing power consumption. In an example, the asynchronous fabric can allow memory references to proceed in parallel with computation, thereby providing more efficient streaming kernels. In an example, the various tiles can include built-in support for loop-based constructs and can support nested looping kernels.

The synchronous fabric can allow multiple tiles to be pipelined, such as without a need for data queuing. Tiles that participate in a synchronous domain can, for example, act as a single pipelined data path. A first or base tile (e.g., Tile N−2, in the example of FIG. 8) of a synchronous domain can initiate a thread of work through the pipelined tiles. The base tile can be responsible for starting work on a predefined cadence referred to herein as a Spoke Count. For example, if the Spoke Count is 3, then the base tile can initiate work every third clock cycle.

In an example, the synchronous domain comprises a set of connected tiles in the HTF cluster 802. Execution of a thread can begin at the domain's base tile and can progress from the base tile, via the synchronous fabric, to other tiles in the same domain. The base tile can provide the instruction to be executed for the first tile. The first tile can, by default, provide the same instruction for the other connected tiles to execute. However, in some examples, the base tile, or a subsequent tile, can conditionally specify or use an alternative instruction. The alternative instruction can be chosen by having the tile's data path produce a Boolean conditional value, and then can use the Boolean value to choose between an instruction set of the current tile and the alternate instruction.

The asynchronous fabric can be used to perform operations that occur asynchronously relative to a synchronous domain. Each tile in the HTF cluster 802 can include an interface to the asynchronous fabric. The inbound interface can include, for example, a FIFO buffer or queue (e.g., AF IN QUEUE) to provide storage for message that cannot be immediately processed. Similarly, the outbound interface of the asynchronous fabric can include a FIFO buffer or queue (e.g., AF OUT QUEUE) to provide storage for messages that cannot be immediately sent out.

In an example, messages in the asynchronous fabric can be classified as data messages or control messages. Data messages can include a SIMD width data value that is written to either tile memory 0 (MEM_0) or memory 1 (MEM_1). Control messages can be configured to control thread creation, to free resources, or to issue external memory references.

A tile in the HTF cluster 802 can perform various compute operations for the HTF. The compute operations can be performed by configuring the data path within the tile. In an example, a tile includes two functional blocks that perform the compute operations for the tile: a Multiply and Shift Operation block (MS OP) and an Arithmetic, Logical, and Bit Operation block (ALB OP). The two blocks can be configured to perform pipelined operations such as a Multiply and Add, or a Shift and Add, among others.

In an example, each instance of a memory-compute device in a system can have a complete supported instruction set for its operator blocks (e.g., MS OP and ALB OP). In this case, binary compatibility can be realized across all devices in the system. However, in some examples, it can be helpful to maintain a base set of functionality and optional instruction set classes, such as to meet various design tradeoffs, such as die size. The approach can be similar to how the RISC-V instruction set has a base set and multiple optional instruction subsets.

In an example, the example tile 804 can include a Spoke RAM. The Spoke RAM can be used to specify which input (e.g., from among the four SF tile inputs and the base tile input) is the primary input for each clock cycle. The Spoke RAM read address input can originate at a counter that counts from zero to Spoke Count minus one. In an example, different spoke counts can be used on different tiles, such as within the same HTF cluster 802, to allow a number of slices, or unique tile instances, used by an inner loop to determine the performance of a particular application or instruction set. In an example, the Spoke RAM can specify when a synchronous input is to be written to a tile memory, for instance when multiple inputs for a particular tile instruction are used and one of the inputs arrives before the others. The early-arriving input can be written to the tile memory and can be later read when all of the inputs are available. In this example, the tile memory can be accessed as a FIFO memory, and FIFO read and write pointers can be stored in a register-based memory region or structure in the tile memory.

FIG. 9A and FIG. 9B illustrate generally an example of a chiplet system that can be used to implement one or more aspects of the CNM system 402. As similarly mentioned above, a node in the CNM system 402, or a device within a node in the CNM system 402, can include a chiplet-based architecture or compute-near-memory (CNM) chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips," potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics can be assembled in a modular manner to provide an assembly with various desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

FIG. 9A and FIG. 9B illustrate generally an example of a chiplet system, according to an embodiment. FIG. 9A is a representation of the chiplet system 902 mounted on a peripheral board 904, that can be connected to a broader computer system by a peripheral component interconnect express (PCIe), for example. The chiplet system 902 includes a package substrate 906, an interposer 908, and four chiplets, an application chiplet 910, a host interface chiplet 912, a memory controller chiplet 914, and a memory device chiplet 916. Other systems can include many additional chiplets to provide additional functionalities as will be apparent from the following discussion. The package of the chiplet system 902 is illustrated with a lid or cover 918, though other packaging techniques and structures for the chiplet system can be used. FIG. 9B is a block diagram labeling the components in the chiplet system for clarity.

The application chiplet 910 is illustrated as including a chiplet system NOC 920 to support a chiplet network 922 for inter-chiplet communications. In example embodiments the chiplet system NOC 920 can be included on the application chiplet 910. In an example, the first NOC 418 from the example of FIG. 4 can be defined in response to selected support chiplets (e.g., host interface chiplet 912, memory controller chiplet 914, and memory device chiplet 916) thus enabling a designer to select an appropriate number or chiplet network connections or switches for the chiplet system NOC 920. In an example, the chiplet system NOC 920 can be located on a separate chiplet, or within the interposer 908. In examples as discussed herein, the chiplet system NOC 920 implements a chiplet protocol interface (CPI) network.

In an example, the chiplet system 902 can include or comprise a portion of the first memory-compute node 404 or the first memory-compute device 412. That is, the various blocks or components of the first memory-compute device 412 can include chiplets that can be mounted on the peripheral board 904, the package substrate 906, and the interposer 908. The interface components of the first memory-compute device 412 can comprise, generally, the host interface chiplet 912, the memory and memory control-related components of the first memory-compute device 412 can comprise, generally, the memory controller chiplet 914, the various accelerator and processor components of the first memory-compute device 412 can comprise, generally, the application chiplet 910 or instances thereof, and so on.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 922. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 922.

CPI can use a variety of different physical layers to transmit packets. The physical layer can include simple conductive connections, or can include drivers to increase the voltage, or otherwise facilitate transmitting the signals over longer distances. An example of one such a physical layer can include the Advanced Interface Bus (AIB), which in various examples, can be implemented in the interposer 908. AIB transmits and receives data using source synchronous data transfers with a forwarded clock. Packets are transferred across the AIB at single data rate (SDR) or dual data rate (DDR) with respect to the transmitted clock. Various channel widths are supported by AIB. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (e.g., non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (e.g., 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 910, provides a sender, such as the memory controller chiplet 914, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

The example of FIG. 9A includes a chiplet mesh network 924 that uses a direct, chiplet-to-chiplet technique without a need for the chiplet system NOC 920. The chiplet mesh network 924 can be implemented in CPI, or another chiplet-to-chiplet protocol. The chiplet mesh network 924 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5, DDR6), can be used to connect a device to a chiplet. Connection of a chiplet system or individual chiplets to external devices (such as a larger system can be through a desired interface (for example, a PCIe interface). Such an external interface can be implemented, in an example, through the host interface chiplet 912, which in the depicted example, provides a PCIe interface external to chiplet system. Such dedicated chiplet interfaces 926 are generally employed when a convention or standard in the industry has converged on such an interface. The illustrated example of a Double Data Rate (DDR) interface connecting the memory controller chiplet 914 to a dynamic random access memory (DRAM) memory device chiplet 916 is just such an industry convention.

Of the variety of possible support chiplets, the memory controller chiplet 914 is likely present in the chiplet system due to the near omnipresent use of storage for computer processing as well as sophisticated state-of-the-art for memory devices. Thus, using memory device chiplets 916 and memory controller chiplets 914 produced by others gives chiplet system designers access to robust products by sophisticated producers. Generally, the memory controller chiplet 914 provides a memory device-specific interface to read, write, or erase data. Often, the memory controller chiplet 914 can provide additional features, such as error detection, error correction, maintenance operations, or atomic operator execution. For some types of memory, maintenance operations tend to be specific to the memory device chiplet 916, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 914. In other chiplet systems, the atomic operators can be performed by other chiplets. For example, an atomic operator of "increment" can be specified in a command by the application chiplet 910, the command including a memory address and possibly an increment value. Upon receiving the command, the memory controller chiplet 914 retrieves a number from the specified memory address, increments the number by the amount specified in the command, and stores the result. Upon a successful completion, the memory controller chiplet 914 provides an indication of the command success to the application chiplet 910. Atomic operators avoid transmitting the data across the chiplet mesh network 924, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 914.

The memory device chiplet 916 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 916 as a chiplet, however, the device can reside elsewhere, such as in a different package on the peripheral board 904. For many applications, multiple memory device chiplets can be provided. In an example, these memory device chiplets can each implement one or multiple storage technologies and may include integrated compute hosts. In an example, a memory chiplet can include, multiple stacked memory die of different technologies, for example one or more static random access memory (SRAM) devices stacked or otherwise in communication with one or more dynamic random access memory (DRAM) devices. In an example, the memory controller chiplet 914 can serve to coordinate operations between multiple memory chiplets in the chiplet system 902, for example, to use one or more memory chiplets in one or more levels of cache storage, and to use one or more additional memory chiplets as main memory. The chiplet system 902 can include multiple memory controller chiplet 914 instances, as can be used to provide memory control functionality for separate hosts, processors, sensors, networks, etc. A chiplet architecture, such as in the illustrated system, offers advantages in allowing adaptation to different memory storage technologies; and different memory interfaces, through updated chiplet configurations, such as without requiring redesign of the remainder of the system structure.

Figure 10:
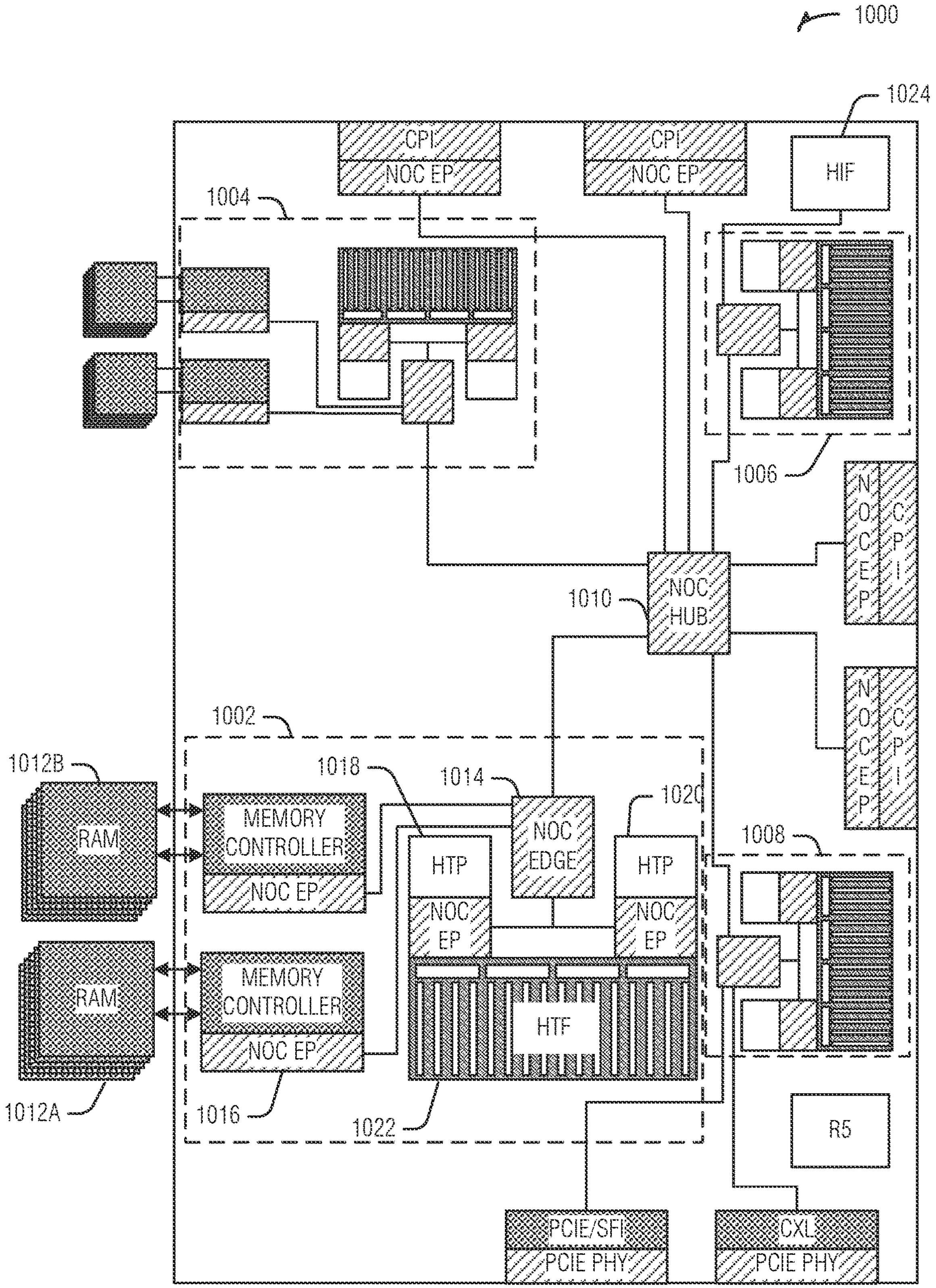
FIG. 10 illustrates generally an example of a chiplet-based implementation for a memory-compute device, according to an embodiment.

FIG. 10 illustrates generally an example of a chiplet-based implementation for a memory-compute device, according to an embodiment. The example includes an implementation with four compute-near-memory, or CNM, chiplets, and each of the CNM chiplets can include or comprise portions of the first memory-compute device 412 or the first memory-compute node 404 from the example of FIG. 4. The various portions can themselves include or comprise respective chiplets. The chiplet-based implementation can include or use CPI-based intra-system communications, as similarly discussed above in the example chiplet system 902 from FIG. 9A and FIG. 9B.

The example of FIG. 10 includes a first CNM package 1000 comprising multiple chiplets. The first CNM package 1000 includes a first chiplet 1002, a second chiplet 1004, a third chiplet 1006, and a fourth chiplet 1008 coupled to a CNM NOC hub 1010. Each of the first through fourth chiplets can comprise instances of the same, or substantially the same, components or modules. For example, the chiplets can each include respective instances of an HTP accelerator, an HTF accelerator, and memory controllers for accessing internal or external memories.

In the example of FIG. 10, the first chiplet 1002 includes a first NOC hub edge 1014 coupled to the CNM NOC hub 1010. The other chiplets in the first CNM package 1000 similarly include NOC hub edges or endpoints. The switches in the NOC hub edges facilitate intra-chiplet, or intra-chiplet-system, communications via the CNM NOC hub 1010.

The first chiplet 1002 can further include one or multiple memory controllers 1016. The memory controllers 1016 can correspond to respective different NOC endpoint switches interfaced with the first NOC hub edge 1014. In an example, the memory controller 1016 comprises the memory controller chiplet 914 or comprises the memory controller 430, or comprises the memory subsystem 500, or other memory-compute implementation. The memory controllers 1016 can be coupled to respective different memory devices, for example including a first external memory module **1012*a* or a second external memory module 1012*b***. The external memory modules can include, e.g., GDDR6 memories that can be selectively accessed by the respective different chiplets in the system.

The first chiplet 1002 can further include a first HTP chiplet 1018 and second HTP chiplet 1020, such as coupled to the first NOC hub edge 1014 via respective different NOC endpoint switches. The HTP chiplets can correspond to HTP accelerators, such as the HTP 440 from the example of FIG. 4, or the HTP accelerator 700 from the example of FIG. 7. The HTP chiplets can communicate with the HTF chiplet 1022. The HTF chiplet 1022 can correspond to an HTF accelerator, such as the HTF 442 from the example of FIG. 4, or the HTF 800 from the example of FIG. 8.

The CNM NOC hub 1010 can be coupled to NOC hub instances in other chiplets or other CNM packages by way of various interfaces and switches. For example, the CNM NOC hub 1010 can be coupled to a CPI interface by way of multiple different NOC endpoints on the first CNM package 1000. Each of the multiple different NOC endpoints can be coupled, for example, to a different node outside of the first CNM package 1000. In an example, the CNM NOC hub 1010 can be coupled to other peripherals, nodes, or devices using CTCPI or other, non-CPI protocols. For example, the first CNM package 1000 can include a PCIe scale fabric interface (PCIE/SFI) or a CXL interface (CXL) configured to interface the first CNM package 1000 with other devices. In an example, devices to which the first CNM package 1000 is coupled using the various CPI, PCIe, CXL, or other fabric, can make up a common global address space.

In the example of FIG. 10, the first CNM package 1000 includes a host interface 1024 (HIF) and a host processor (R5). The host interface 1024 can correspond to, for example, the HIF 420 from the example of FIG. 4. The host processor, or R5, can correspond to the internal host processor 422 from the example of FIG. 4. The host interface 1024 can include a PCI interface for coupling the first CNM package 1000 to other external devices or systems. In an example, work can be initiated on the first CNM package 1000, or a tile cluster within the first CNM package 1000, by the host interface 1024. For example, the host interface 1024 can be configured to command individual HTF tile clusters, such as among the various chiplets in the first CNM package 1000, into and out of power/clock gate modes.

Figure 11:
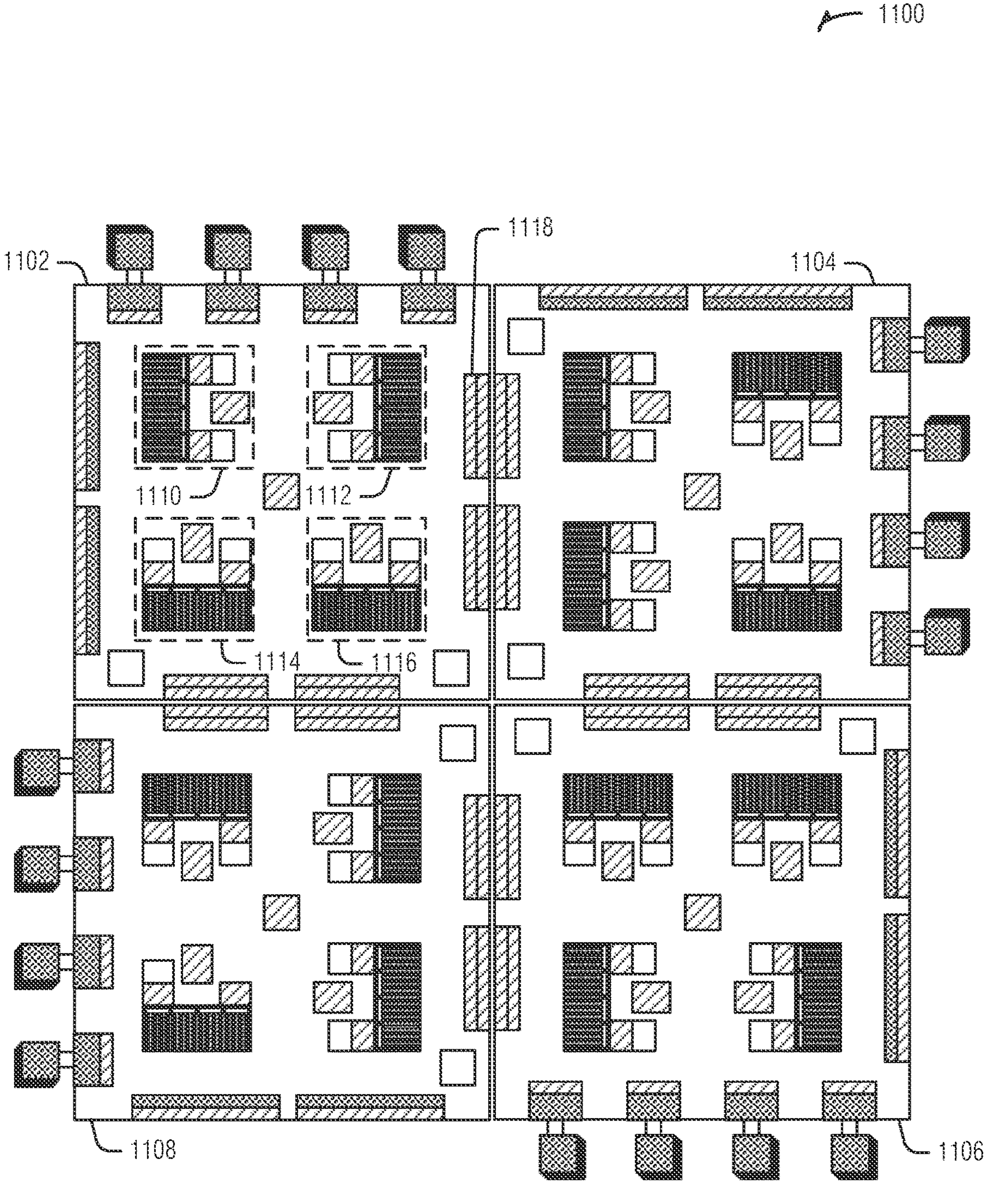
FIG. 11 illustrates an example tiling of memory-compute device chiplets, according to an embodiment.

FIG. 11 illustrates an example tiling of memory-compute devices, according to an embodiment. In FIG. 11, a tiled chiplet example 1100 includes four instances of different compute-near-memory clusters of chiplets, where the clusters are coupled together. Each instance of a compute-near-memory chiplet can itself include one or more constituent chiplets (e.g., host processor chiplets, memory device chiplets, interface chiplets, and so on).

The tiled chiplet example 1100 includes, as one or multiple of its compute-near-memory (CNM) clusters, instances of the first CNM package 1000 from the example of FIG. 10. For example, the tiled chiplet example 1100 can include a first CNM cluster 1102 that includes a first chiplet 1110 (e.g., corresponding to the first chiplet 1002), a second chiplet 1112 (e.g., corresponding to the second chiplet 1004), a third chiplet 1114 (e.g., corresponding to the third chiplet 1006), and a fourth chiplet 1116 (e.g., corresponding to the fourth chiplet 1008). The chiplets in the first CNM cluster 1102 can be coupled to a common NOC hub, which in turn can be coupled to a NOC hub in an adjacent cluster or clusters (e.g., in a second CNM cluster 1104 or a fourth CNM cluster 1108).

In the example of FIG. 11, the tiled chiplet example 1100 includes the first CNM cluster 1102, the second CNM cluster 1104, a third CNM cluster 1106, and the fourth CNM cluster 1108. The various different CNM chiplets can be configured in a common address space such that the chiplets can allocate and share resources across the different tiles. In an example, the chiplets in the cluster can communicate with each other. For example, the first CNM cluster 1102 can be communicatively coupled to the second CNM cluster 1104 via an inter-chiplet CPI interface 1118, and the first CNM cluster 1102 can be communicatively coupled to the fourth CNM cluster 1108 via another or the same CPI interface. The second CNM cluster 1104 can be communicatively coupled to the third CNM cluster 1106 via the same or other CPI interface, and so on.

In an example, one of the compute-near-memory chiplets in the tiled chiplet example 1100 can include a host interface (e.g., corresponding to the host interface 1024 from the example of FIG. 10) that is responsible for workload balancing across the tiled chiplet example 1100. The host interface can facilitate access to host-based command request queues and response queues, such as from outside of the tiled chiplet example 1100. The host interface can dispatch new threads of execution using hybrid threading processors and the hybrid threading fabric in one or more of the compute-near-memory chiplets in the tiled chiplet example 1100.

Figure 12:
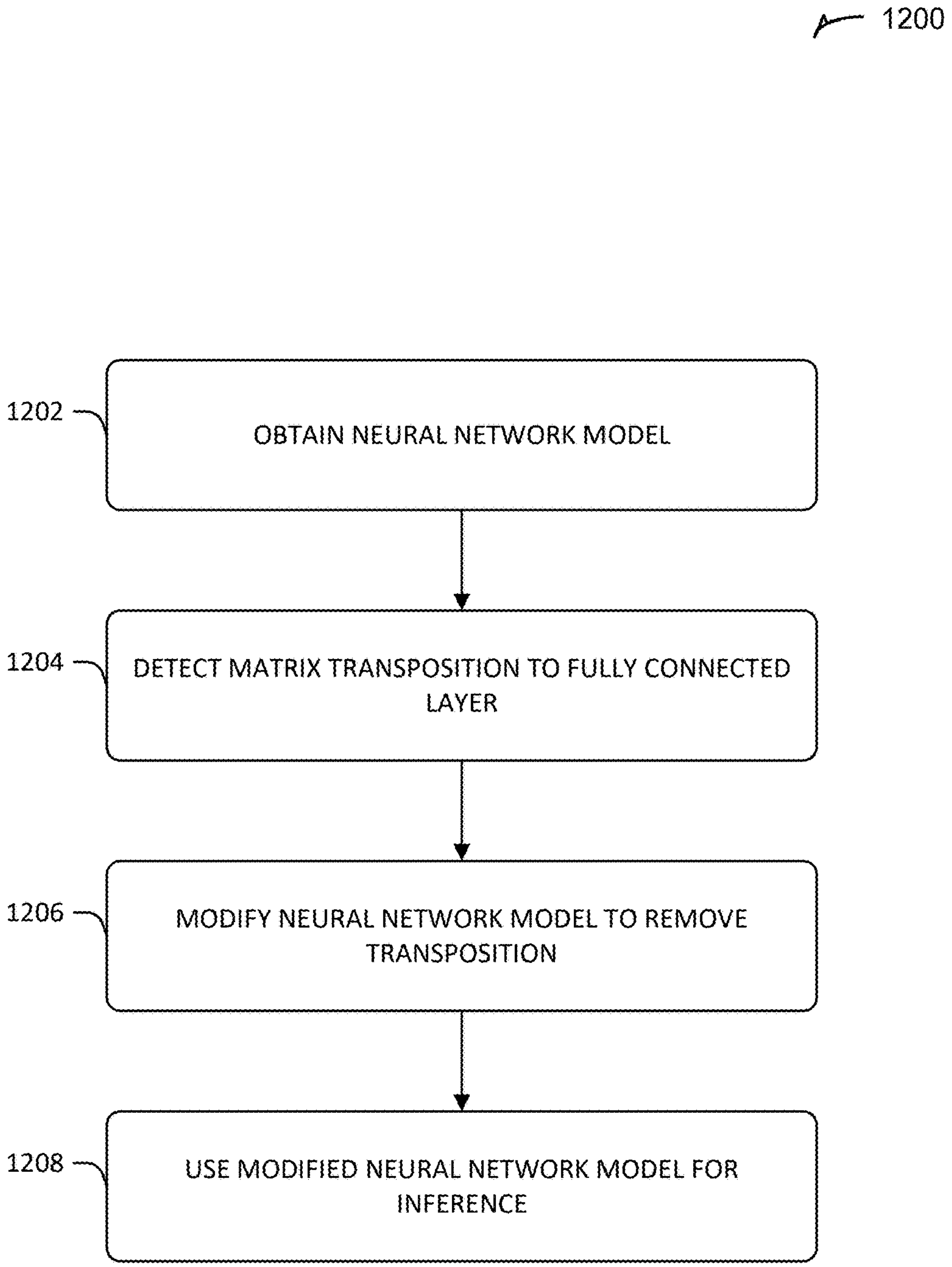
FIG. 12 is a flow chart of an example of a method for neural network transpose layer removal, according to an embodiment.

FIG. 12 is a flow chart of an example of a method 1200 for neural network transpose layer removal, according to an embodiment. Operations of the method 1200 are performed by hardware, such as that described with respect to FIGS. 1, 4-11, and 13, such as the machine 1300, the processor 102, the host system 408, the memory device 412, the HTP 700, the HTF 800, etc.

At operation 1202, a neural network model is obtained (e.g., received or retrieved). This neural network model includes matrices of synaptic weights arranged in several layers.

At operation 1204, a transposition of a matrix to a fully connected layer in the neural network model is detected.

At operation 1206, in response to (e.g., based on) detecting the matrix transposition, a modified neural network model is created. To create the modified neural network model, the fully connected layer values (e.g., synaptic weights) are changed to correspond to values in the matrix prior to the transposition. In an example, changing the fully connected layer values to correspond to values in the matrix prior to the transposition includes mapping a first position of the matrix to a second position in the fully connected layer under a flatten operation of the neural network model and moving a weight, of the fully connected layer, that corresponds to the first position to the second position.

In an example, layers of the neural network model prior to the fully connected layer are convolutional neural network layers. In an example, the convolutional neural network layers were trained separately from layers subsequent to the fully connected layer. Here, the transposition is a layer incorporated into the neural network model to interface the convolutional neural layers to the subsequent layers. In an example, the convolutional neural network layers are an instance of a Multi-Task Cascaded Convolutional Network (MTCNN) for facial recognition and bounding boxes of faces in images.

In an example, moving the weight of the fully connected layer includes computing weights for a new convolution CONV2 of the fully connected layer—CONV2 has a first dimension of one and a second dimension of OUTSIZE—from an original convolution CONV1. An example of this computation is illustrated below, using nested FOR loops:

```
for c in range (NCHANNELS):
  for h in range (HEIGHT):
    for w in range (WIDTH):
      for j in range (OUTSIZE):
        i1 = c * HEIGHT * WIDTH + h * WIDTH + w;
        i2 = c * HEIGHT * WIDTH + w * WIDTH + h; and
        CONV2.weight[j][i1] = CONV1.weight[j][i2].
```

The variables 'c', 'h', 'w', and 'j' respectively store the value of NCHANNELS, HEIGHT, WIDTH, and OUTSIZE for each iteration of the loops.

Once the fully connected layer values are changed, the transposition is eliminated from the neural network model to create the modified neural network model. In an example, detecting the transposition of the matrix to the fully connected layer (operation 1204) or creating the modified neural network model (operation 1206) are performed by a compiler targeting computer hardware.

At operation 1208, the modified neural network model is provided for inference on computer hardware. In an example, providing the modified neural network model for inference on the computer hardware includes creating at least one of an installation package, an executable application, a loadable module, or a script to run on the computer hardware.

In an example, the computer hardware conforms to a single instruction, multiple data (SIMD) architecture. In an example, the computer hardware is a hybrid threading fabric (HTF) device (e.g., HTF 442 or HTF 800). In an example, the HTF is included in a memory device (e.g., CNM device 412 or memory device package 902) that also includes a hybrid threading processor (HTP) (e.g., HTP 440 or HTP 700), memory controller (e.g., memory controller 430, memory controller 500, or memory compute device chiplet 914), and memory. In an example, detecting the transposition of the matrix to the fully connected layer and creating the modified neural network model are performed by a just-in-time (JIT) compiler of the memory device. In an example, the memory device is configured to be included in a vehicle control system that interfaces with a camera of the vehicle configured to capture images as a vehicle operates and provide facial recognition and bounding boxes of faces in the images.

Figure 13:
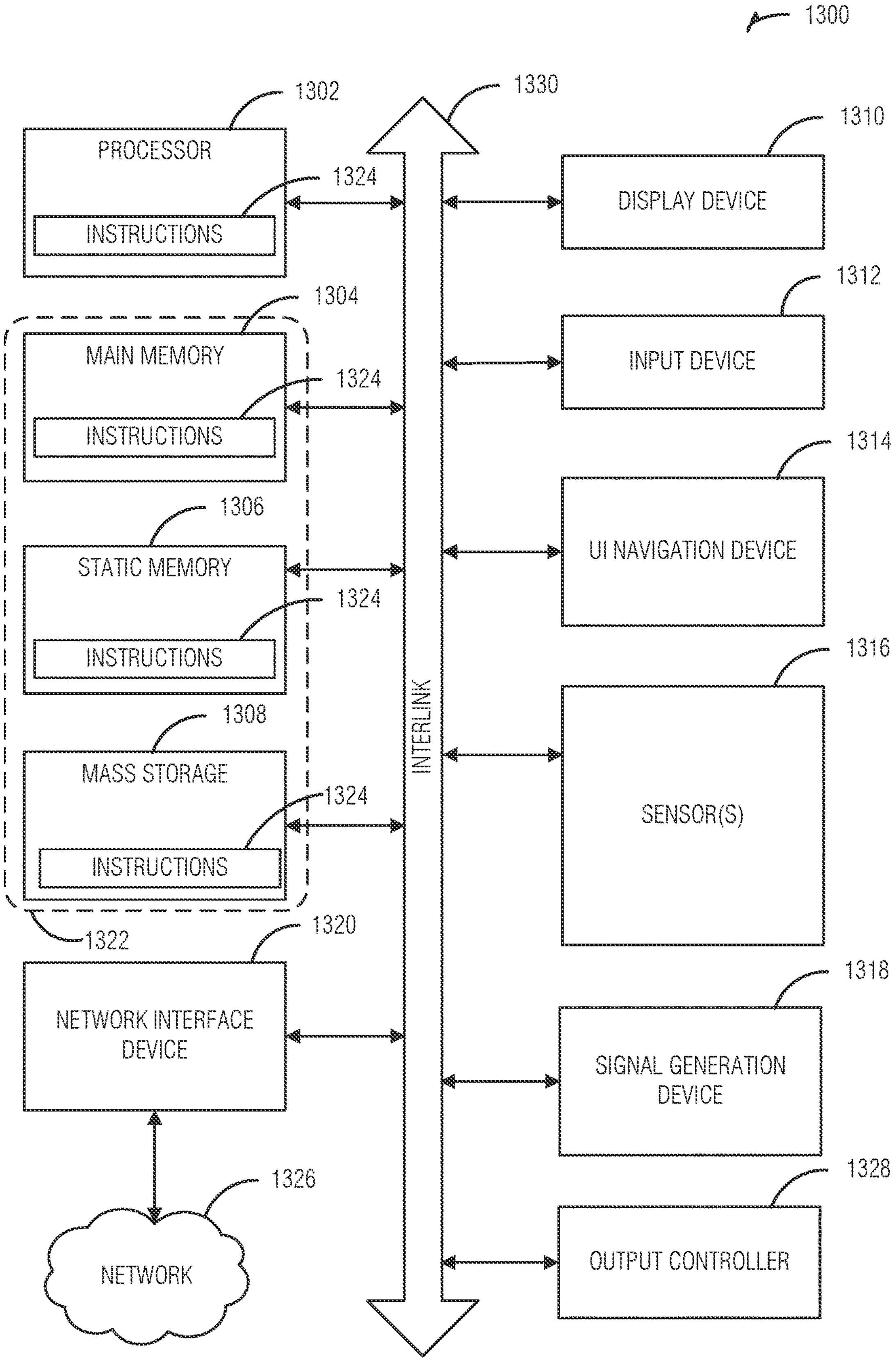
FIG. 13 illustrates a block diagram of an example machine with which, in which, or by which any one or more of the techniques (e.g., methodologies) discussed herein can be implemented.

FIG. 13 illustrates a block diagram of an example machine 1300 with which, in which, or by which any one or more of the techniques (e.g., methodologies) discussed herein can be implemented. Examples, as described herein, can include, or can operate by, logic or a number of components, or mechanisms in the machine 1300. Circuitry (e.g., processing circuitry) is a collection of circuits implemented in tangible entities of the machine 1300 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1300.

In alternative embodiments, the machine 1300 can operate as a standalone device or can be connected (e.g., networked) to other machines. In a networked deployment, the machine 1300 can operate in the capacity of a server machine, a client machine, or both in server-client network environments. In an example, the machine 1300 can act as a peer machine in peer-to-peer (P2P) (or other distributed) network environment. The machine 1300 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1300 (e.g., computer system) can include a hardware processor 1302 (e.g., a central processing unit (CPU), a graphics processing unit (GPU), a hardware processor core, or any combination thereof), a main memory 1304, a static memory 1306 (e.g., memory or storage for firmware, microcode, a basic-input-output (BIOS), unified extensible firmware interface (UEFI), etc.), and mass storage device 1308 (e.g., hard drives, tape drives, flash storage, or other block devices) some or all of which can communicate with each other via an interlink 1330 (e.g., bus). The machine 1300 can further include a display device 1310, an alphanumeric input device 1312 (e.g., a keyboard), and a user interface (UI) Navigation device 1314 (e.g., a mouse). In an example, the display device 1310, the input device 1312, and the UI navigation device 1314 can be a touch screen display. The machine 1300 can additionally include a mass storage device 1308 (e.g., a drive unit), a signal generation device 1318 (e.g., a speaker), a network interface device 1320, and one or more sensor(s) 1316, such as a global positioning system (GPS) sensor, compass, accelerometer, or other sensor. The machine 1300 can include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1302, the main memory 1304, the static memory 1306, or the mass storage device 1308 can be, or include, a machine-readable media 1322 on which is stored one or more sets of data structures or instructions 1324 (e.g., software) embodying or used by any one or more of the techniques or functions described herein. The instructions 1324 can also reside, completely or at least partially, within any of registers of the hardware processor 1302, the main memory 1304, the static memory 1306, or the mass storage device 1308 during execution thereof by the machine 1300. In an example, one or any combination of the hardware processor 1302, the main memory 1304, the static memory 1306, or the mass storage device 1308 can constitute the machine-readable media 1322. While the machine-readable media 1322 is illustrated as a single medium, the term "machine-readable medium" can include a single medium or multiple media (e.g., a centralized or distributed database, or associated caches and servers) configured to store the one or more instructions 1324.

The term "machine readable medium" can include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1322 can be representative of the instructions 1324, such as instructions 1324 themselves or a format from which the instructions 1324 can be derived. This format from which the instructions 1324 can be derived can include source code, encoded instructions (e.g., in compressed or encrypted form), packaged instructions (e.g., split into multiple packages), or the like. The information representative of the instructions 1324 in the machine-readable media 1322 can be processed by processing circuitry into the instructions to implement any of the operations discussed herein. For example, deriving the instructions 1324 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1324.

In an example, the derivation of the instructions 1324 can include assembly, compilation, or interpretation of the information (e.g., by the processing circuitry) to create the instructions 1324 from some intermediate or preprocessed format provided by the machine-readable media 1322. The information, when provided in multiple parts, can be combined, unpacked, and modified to create the instructions 1324. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1324 can be further transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 can include one or more physical jacks (e.g., Ethernet, coaxial, or phone jacks) or one or more antennas to connect to the network 1326. In an example, the network interface device 1320 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1300, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 is an apparatus comprising: a hybrid threading fabric (HTF); and a processor configured to: obtain a neural network model that includes matrices of synaptic weights arranged in several layers; detect, in the neural network model, a transposition of a matrix to a fully connected layer; create, in response to detection of the matrix transposition, a modified neural network model, creation of the modified neural network model including: changes to values of the fully connected layer to correspond to values in the matrix prior to the transposition; and elimination of the transposition; and provide the modified neural network model for inference on the HTF.

In Example 2, the subject matter of Example 1, wherein the changes to the values of the fully connected layer to correspond to values in the matrix prior to the transposition include the processor configured to: map a first position of the matrix to a second position in the fully connected layer under a flatten operation of the neural network model; and move a weight, of the fully connected layer, that corresponds to the first position to the second position.

In Example 3, the subject matter of Example 2, wherein layers of the neural network model prior to the fully connected layer are convolutional neural network layers.

In Example 4, the subject matter of Example 3, wherein, to move the weight, the processor is configured to compute weights for a new convolution CONV2 of the fully connected layer, which has a first dimension of one and a second dimension of OUTSIZE, from an original convolution CONV1: for c in range (NCHANNELS): for h in range (HEIGHT): for w in range (WIDTH): for j in range (OUTSIZE): i1=c*HEIGHT*WIDTH+h*WIDTH+w; i2=c*HEIGHT*WIDTH+w*WIDTH+h; and CONV2·weight[j][i1]=CONV1·weight[j][i2].

In Example 5, the subject matter of any of Examples 3-4, wherein the convolutional neural network layers were trained separately from layers subsequent to the fully connected layer, and wherein the transposition is a layer incorporated into the neural network model to interface the convolutional neural network layers to the layers subsequent to the fully connected layer.

In Example 6, the subject matter of Example 5, wherein the convolutional neural network layers are an instance of Multi-Task Cascaded Convolutional Networks (MTCNN) for facial recognition and bounding boxes of faces in images.

In Example 7, the subject matter of any of Examples 1-6, wherein, the processor is configured to detect the transposition of the matrix to the fully connected layer and the processor is configured to create the modified neural network model by a compiler targeting the HTF.

In Example 8, the subject matter of any of Examples 1-7, wherein the apparatus is a memory device that includes a hybrid threading processor (HTP), a memory controller, and memory.

In Example 9, the subject matter of Example 8, wherein the processor is the HTP.

In Example 10, the subject matter of any of Examples 1-9, wherein the apparatus is a compute-near memory node that includes a host processor and a memory-compute device, wherein the processor is the host processor and wherein the HTF is included in the memory-compute device.

In Example 11, the subject matter of any of Examples 8-10, wherein, the processor is configured to detect the transposition of the matrix to the fully connected layer and the processor is configured to create the modified neural network model by a just-in-time (JIT) compiler.

In Example 12, the subject matter of any of Examples 8-11, wherein the apparatus is configured to: be included in a vehicle control system that interfaces with a camera of the vehicle configured to capture images as a vehicle operates; and provide facial recognition and bounding boxes of faces in the images through the inference on the HTF.

In Example 13, the subject matter of any of Examples 1-12, wherein, to provide the modified neural network model for inference on the HTF, the processor is configured to create at least one of an installation package, an executable application, a loadable module, or a script to run on the HTF.

Example 14 is a method comprising: obtaining a neural network model that includes matrices of synaptic weights arranged in several layers; detecting, in the neural network model, a transposition of a matrix to a fully connected layer; creating, in response to detecting the matrix transposition, a modified neural network model, including: changing values of the fully connected layer to correspond to values in the matrix prior to the transposition; and eliminating the transposition; and providing the modified neural network model for inference on computer hardware.

In Example 15, the subject matter of Example 14, wherein changing the values of the fully connected layer to correspond to values in the matrix prior to the transposition includes: mapping a first position of the matrix to a second position in the fully connected layer under a flatten operation of the neural network model; and moving a weight, of the fully connected layer, that corresponds to the first position to the second position.

In Example 16, the subject matter of Example 15, wherein layers of the neural network model prior to the fully connected layer are convolutional neural network layers.

In Example 17, the subject matter of Example 16, wherein moving the weight includes computing weights for a new convolution CONV2 of the fully connected layer, which has a first dimension of one and a second dimension of OUTSIZE, from an original convolution CONV1: for c in range (NCHANNELS): for h in range (HEIGHT): for w in range (WIDTH): for j in range (OUTSIZE): i1=c*HEIGHT*WIDTH+h*WIDTH+w; i2=c*HEIGHT*WIDTH+w*WIDTH+h; and CONV2·weight[j][i1]=CONV1·weight[j][i2].

In Example 18, the subject matter of any of Examples 16-17, wherein the convolutional neural network layers were trained separately from layers subsequent to the fully connected layer, and wherein the transposition is a layer incorporated into the neural network model to interface the convolutional neural network layers to the layers subsequent to the fully connected layer.

In Example 19, the subject matter of Example 18, wherein the convolutional neural network layers are an instance of Multi-Task Cascaded Convolutional Networks (MTCNN) for facial recognition and bounding boxes of faces in images.

In Example 20, the subject matter of any of Examples 14-19, wherein detecting the transposition of the matrix to the fully connected layer and creating the modified neural network model are performed by a compiler targeting the computer hardware.

In Example 21, the subject matter of any of Examples 14-20, wherein the computer hardware conforms to a single instruction, multiple data (SIMD) architecture.

In Example 22, the subject matter of Example 21, wherein the computer hardware is a hybrid threading fabric (HTF) device.

In Example 23, the subject matter of Example 22, wherein the HTF device is included in a memory device that also includes a hybrid threading processor (HTP), a memory controller, and memory.

In Example 24, the subject matter of Example 23, wherein detecting the transposition of the matrix to the fully connected layer and creating the modified neural network model are performed by a just-in-time (JIT) compiler of the memory device.

In Example 25, the subject matter of any of Examples 23-24, wherein the memory device is configured to: be included in a vehicle control system that interfaces with a camera of the vehicle configured to capture images as a vehicle operates; and provide facial recognition and bounding boxes of faces in the images through the inference on the computer hardware.

In Example 26, the subject matter of any of Examples 14-25, wherein providing the modified neural network model for inference on the computer hardware includes creating at least one of an installation package, an executable application, a loadable module, or a script to run on the computer hardware.

Example 27 is machine readable media including instructions that, when executed by processing circuitry, cause processing circuitry to perform operations comprising: obtaining a neural network model that includes matrices of synaptic weights arranged in several layers; detecting, in the neural network model, a transposition of a matrix to a fully connected layer; creating, in response to detecting the matrix transposition, a modified neural network model, including: changing values of the fully connected layer to correspond to values in the matrix prior to the transposition; and eliminating the transposition; and providing the modified neural network model for inference on computer hardware.

In Example 28, the subject matter of Example 27, wherein changing the values of the fully connected layer to correspond to values in the matrix prior to the transposition includes: mapping a first position of the matrix to a second position in the fully connected layer under a flatten operation of the neural network model; and moving a weight, of the fully connected layer, that corresponds to the first position to the second position.

In Example 29, the subject matter of Example 28, wherein layers of the neural network model prior to the fully connected layer are convolutional neural network layers.

In Example 30, the subject matter of Example 29, wherein moving the weight includes computing weights for a new convolution CONV2 of the fully connected layer, which has a first dimension of one and a second dimension of OUTSIZE, from an original convolution CONV1: for c in range (NCHANNELS): for h in range (HEIGHT): for w in range (WIDTH): for j in range (OUTSIZE): i1=c*HEIGHT*WIDTH+h*WIDTH+w; i2=c*HEIGHT*WIDTH+w*WIDTH+h; and CONV2·weight[j][i1]=CONV1·weight[j][i2].

In Example 31, the subject matter of any of Examples 29-30, wherein the convolutional neural network layers were trained separately from layers subsequent to the fully connected layer, and wherein the transposition is a layer incorporated into the neural network model to interface the convolutional neural network layers to the layers subsequent to the fully connected layer.

In Example 32, the subject matter of Example 31, wherein the convolutional neural network layers are an instance of Multi-Task Cascaded Convolutional Networks (MTCNN) for facial recognition and bounding boxes of faces in images.

In Example 33, the subject matter of any of Examples 27-32, wherein detecting the transposition of the matrix to the fully connected layer and creating the modified neural network model are performed by a compiler targeting the computer hardware.

In Example 34, the subject matter of any of Examples 27-33, wherein the computer hardware conforms to a single instruction, multiple data (SIMD) architecture.

In Example 35, the subject matter of Example 34, wherein the computer hardware is a hybrid threading fabric (HTF) device.

In Example 36, the subject matter of Example 35, wherein the HTF device is included in a memory device that also includes a hybrid threading processor (HTP), a memory controller, and memory.

In Example 37, the subject matter of Example 36, wherein detecting the transposition of the matrix to the fully connected layer and creating the modified neural network model are performed by a just-in-time (JIT) compiler of the memory device.

In Example 38, the subject matter of any of Examples 36-37, wherein the memory device is configured to: be included in a vehicle control system that interfaces with a camera of the vehicle configured to capture images as a vehicle operates; and provide facial recognition and bounding boxes of faces in the images through the inference on the computer hardware.

In Example 39, the subject matter of any of Examples 27-38, wherein providing the modified neural network model for inference on the computer hardware includes creating at least one of an installation package, an executable application, a loadable module, or a script to run on the computer hardware.

Example 40 is a system comprising: means for obtaining a neural network model that includes matrices of synaptic weights arranged in several layers; means for detecting, in the neural network model, a transposition of a matrix to a fully connected layer; means for creating, in response to detecting the matrix transposition, a modified neural network model, including: means for changing values of the fully connected layer to correspond to values in the matrix prior to the transposition; and means for eliminating the transposition; and means for providing the modified neural network model for inference on computer hardware.

In Example 41, the subject matter of Example 40, wherein the means for changing the values of the fully connected layer to correspond to values in the matrix prior to the transposition include: means for mapping a first position of the matrix to a second position in the fully connected layer under a flatten operation of the neural network model; and means for moving a weight, of the fully connected layer, that corresponds to the first position to the second position.

In Example 42, the subject matter of Example 41, wherein layers of the neural network model prior to the fully connected layer are convolutional neural network layers.

In Example 43, the subject matter of Example 42, wherein the means for moving the weight include means for computing weights for a new convolution CONV2 of the fully connected layer, which has a first dimension of one and a second dimension of OUTSIZE, from an original convolution CONV1: for c in range (NCHANNELS): for h in range (HEIGHT): for w in range (WIDTH): for j in range (OUTSIZE): i1=c*HEIGHT*WIDTH+h*WIDTH+w; i2=c*HEIGHT*WIDTH+w*WIDTH+h; and CONV2·weight[j][i1]=CONV1·weight[j][i2].

In Example 44, the subject matter of any of Examples 42-43, wherein the convolutional neural network layers were trained separately from layers subsequent to the fully connected layer, and wherein the transposition is a layer incorporated into the neural network model to interface the convolutional neural network layers to the layers subsequent to the fully connected layer.

In Example 45, the subject matter of Example 44, wherein the convolutional neural network layers are an instance of Multi-Task Cascaded Convolutional Networks (MTCNN) for facial recognition and bounding boxes of faces in images.

In Example 46, the subject matter of any of Examples 40-45, wherein the means for detecting the transposition of the matrix to the fully connected layer and the means for creating the modified neural network model are implemented by a compiler targeting the computer hardware.

In Example 47, the subject matter of any of Examples 40-46, wherein the computer hardware conforms to a single instruction, multiple data (SIMD) architecture.

In Example 48, the subject matter of Example 47, wherein the computer hardware is a hybrid threading fabric (HTF) device.

In Example 49, the subject matter of Example 48, wherein the HTF device is included in a memory device that also includes a hybrid threading processor (HTP), a memory controller, and memory.

In Example 50, the subject matter of Example 49, wherein the means for detecting the transposition of the matrix to the fully connected layer and the means for creating the modified neural network model are implemented by a just-in-time (JIT) compiler of the memory device.

In Example 51, the subject matter of any of Examples 49-50, wherein the memory device is configured to: be included in a vehicle control system that interfaces with a camera of the vehicle configured to capture images as a vehicle operates; and provide facial recognition and bounding boxes of faces in the images through the inference on the computer hardware.

In Example 52, the subject matter of any of Examples 40-51, wherein the means for providing the modified neural network model for inference on the computer hardware include means for creating at least one of an installation package, an executable application, a loadable module, or a script to run on the computer hardware.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:

a hybrid threading fabric (HTF), wherein the HTF includes single-input multiple-output (SIMD) processor; and a processor configured to:

access, from memory or storage of the apparatus, a neural network model that includes matrices of synaptic weights arranged in several layers;

detect, in the neural network model, a transposition of a matrix to a fully connected layer, wherein, to detect the transposition of the matrix to the fully connected layer, the processor is configured to:

tabulate, between each of two layers in the neural network model, neuron-to-neuron connections between the two layers, the fully connected layer including neurons where each of the neurons has at least one connection to a neuron of the other layer; and locate a transpose instruction in the neural network model or a difference in dimensionality between the fully connected layer and the other layer to identify the transposition;

create, in response to detection of the matrix transposition, a modified neural network model, creation of the modified neural network model including:

changes to values of the fully connected layer to correspond to values in the matrix prior to the transposition, wherein, to change the values of the fully connected layer to correspond to values in the matrix prior to the transposition the processor is configured to:

map a first position of the matrix to a second position in the fully connected layer under a flatten operation of the neural network model; and move a weight, of the fully connected layer, that corresponds to the first position to the second position; and elimination of the transposition; and provide the modified neural network model for inference on the HTF, the modified neural network model providing greater inference performance than the neural network model on the HTF due to the elimination of the transposition;

wherein the HTF is configured to run the modified neural network model using the SIMD processor on input data to produce an output with greater performance than running the neural network model on the input to produce the output.

2. The apparatus of claim 1, wherein layers of the neural network model prior to the fully connected layer are convolutional neural network layers.

3. The apparatus of claim 2, wherein, to move the weight, the processor is configured to compute weights for a new convolution CONV2 of the fully connected layer, which has a first dimension of one and a second dimension of OUTSIZE, from an original convolution CONV1:

```
for c in range (NCHANNELS):
  for h in range (HEIGHT):
    for w in range (WIDTH):
      for j in range (OUTSIZE):
        i1 = c * HEIGHT * WIDTH + h * WIDTH + w;
        i2 = c * HEIGHT * WIDTH + w * WIDTH + h; and
        CONV2.weight[j][i1] = CONV1.weight[j][i2], wherein
          NCHANNELS, HEIGHT, and WIDTH are values that
          are part of the fully connected layer from the original
          convolution CONV1, and wherein weight[ ][ ] is a
          matrix representation of the fully connected layer.
```

4. The apparatus of claim 2, wherein the convolutional neural network layers were trained separately from layers subsequent to the fully connected layer, and wherein the transposition is a layer incorporated into the neural network model to interface the convolutional neural network layers to the layers subsequent to the fully connected layer.

5. The apparatus of claim 4, wherein the convolutional neural network layers are an instance of Multi-Task Cascaded Convolutional Networks (MTCNN) for facial recognition and bounding boxes of faces in images.

6. The apparatus of claim 1, wherein, the processor is configured to detect the transposition of the matrix to the fully connected layer and the processor is configured to create the modified neural network model by a compiler targeting the HTF.

7. The apparatus of claim 1, wherein the apparatus is a memory device that includes a hybrid threading processor (HTP), a memory controller, and memory.

8. The apparatus of claim 7, wherein the processor is the HTP.

9. The apparatus of claim 7, wherein, the processor is configured to detect the transposition of the matrix to the fully connected layer and the processor is configured to create the modified neural network model by a just-in-time (JIT) compiler.

10. The apparatus of claim 7, wherein the apparatus is configured to:

be included in a vehicle control system that interfaces with a camera of the vehicle configured to capture images as a vehicle operates; and provide facial recognition and bounding boxes of faces in the images through the inference on the HTF.

11. The apparatus of claim 1, wherein the apparatus is a compute-near memory node that includes a host processor and a memory-compute device, wherein the processor is the host processor and wherein the HTF is included in the memory-compute device.

12. The apparatus of claim 1, wherein, to provide the modified neural network model for inference on the HTF, the processor is configured to create at least one of an installation package, an executable application, a loadable module, or a script to run on the HTF.

13. A method comprising:

accessing, from a location memory or storage, a neural network model that includes matrices of synaptic weights arranged in several layers;

detecting, in the neural network model, a transposition of a matrix to a fully connected layer, wherein detecting the transposition of the matrix to the fully connected layer includes:

tabulating, between each of two layers in the neural network model, neuron-to-neuron connections between the two layers, the fully connected layer including neurons where each of the neurons has at least one connection to a neuron of the other layer; and locating a transpose instruction in the neural network model or a difference in dimensionality between the fully connected layer and the other layer to identify the transposition;

creating, in response to detecting the matrix transposition, a modified neural network model, including:

changing values of the fully connected layer to correspond to values in the matrix prior to the transposition, wherein changing the values of the fully connected layer to correspond to values in the matrix prior to the transposition includes:

mapping a first position of the matrix to a second position in the fully connected layer under a flatten operation of the neural network model; and moving a weight, of the fully connected layer, that corresponds to the first position to the second position; and eliminating the transposition;

providing the modified neural network model for inference on computer hardware, the modified neural network model providing greater inference performance than the neural network model on the computer hardware due to elimination of the transposition, the computer hardware including a single-input multiple-output (SIMD) processor; and running, on the SIMD processor, the modified neural network model on input data to produce an output with greater performance than running the neural network model on the input to produce the output.

14. The method of claim 13, wherein layers of the neural network model prior to the fully connected layer are convolutional neural network layers.

15. The method of claim 14, wherein moving the weight includes computing weights for a new convolution CONV2 of the fully connected layer, which has a first dimension of one and a second dimension of OUTSIZE, from an original convolution CONV1:

```
for c in range (NCHANNELS):
  for h in range (HEIGHT):
    for w in range (WIDTH):
      for j in range (OUTSIZE):
        i1 = c * HEIGHT * WIDTH + h * WIDTH + w;
        i2 = c * HEIGHT * WIDTH + w * WIDTH + h; and
        CONV2.weight[j][i1] = CONV1.weight[j][i2], wherein
          NCHANNELS, HEIGHT, and WIDTH are values that
          are part of the fully connected layer from the original
          convolution CONV1, and wherein weight[ ][ ] is a
          matrix representation of the fully connected layer.
```

16. The method of claim 13, wherein the SIMD processor is included in a memory device that also includes a hybrid threading processor (HTP), a memory controller, and memory.

17. The method of claim 16, wherein the memory device is configured to:

be included in a vehicle control system that interfaces with a camera of the vehicle configured to capture images as a vehicle operates; and provide facial recognition and bounding boxes of faces in the images through the inference on the computer hardware.

18. The method of claim 13, wherein providing the modified neural network model for inference on the computer hardware includes creating at least one of an installation package, an executable application, a loadable module, or a script to run on the computer hardware.

19. Non-transitory machine readable media including instructions that, when executed by processing circuitry, cause processing circuitry to perform operations comprising:

accessing, from a location memory or storage, a neural network model that includes matrices of synaptic weights arranged in several layers;

detecting, in the neural network model, a transposition of a matrix to a fully connected layer, wherein detecting the transposition of the matrix to the fully connected layer includes:

tabulating, between each of two layers in the neural network model, neuron-to-neuron connections between the two layers, the fully connected layer including neurons where each of the neurons has at least one connection to a neuron of the other layer; and locating a transpose instruction in the neural network model or a difference in dimensionality between the fully connected layer and the other layer to identify the transposition;

creating, in response to detecting the matrix transposition, a modified neural network model, including:

changing values of the fully connected layer to correspond to values in the matrix prior to the transposition, wherein changing the values of the fully connected layer to correspond to values in the matrix prior to the transposition includes:

mapping a first position of the matrix to a second position in the fully connected layer under a flatten operation of the neural network model; and moving a weight, of the fully connected layer, that corresponds to the first position to the second position; and eliminating the transposition;

providing the modified neural network model for inference on computer hardware, the modified neural network model providing greater inference performance than the neural network model on the computer hardware due to the elimination of the transposition, the computer hardware including a single-input multiple-output (SIMD) processor; and running, on the SIMD processor, the modified neural network model on input data to produce an output with greater performance than running the neural network model on the input to produce the output.

20. The non-transitory machine readable media of claim 19, wherein layers of the neural network model prior to the fully connected layer are convolutional neural network layers.

21. The non-transitory machine readable media of claim 20, wherein moving the weight includes computing weights for a new convolution CONV2 of the fully connected layer, which has a first dimension of one and a second dimension of OUTSIZE, from an original convolution CONV1:

```
for c in range (NCHANNELS):
  for h in range (HEIGHT):
    for w in range (WIDTH):
      for j in range (OUTSIZE):
        i1 = c * HEIGHT * WIDTH + h * WIDTH + w;
        i2 = c * HEIGHT * WIDTH + w * WIDTH + h; and
        CONV2.weight[j][i1] = CONV1.weight[j][i2], wherein
          NCHANNELS, HEIGHT, and WIDTH are values that
          are part of the fully connected layer from the original
          convolution CONV1, and wherein weight[ ][ ] is a
          matrix representation of the fully connected layer.
```

22. The non-transitory machine readable media of claim 20, wherein the convolutional neural network layers were trained separately from layers subsequent to the fully connected layer, and wherein the transposition is a layer incorporated into the neural network model to interface the convolutional neural network layers to the layers subsequent to the fully connected layer.

23. The non-transitory machine readable media of claim 22, wherein the convolutional neural network layers are an instance of Multi-Task Cascaded Convolutional Networks (MTCNN) for facial recognition and bounding boxes of faces in images.

24. The non-transitory machine readable media of claim 19, wherein detecting the transposition of the matrix to the fully connected layer and creating the modified neural network model are performed by a compiler targeting the computer hardware.

25. The non-transitory machine readable media of claim 19, wherein the computer hardware is a hybrid threading fabric (HTF) device.

26. The non-transitory machine readable media of claim 25, wherein the HTF device is included in a memory device that also includes a hybrid threading processor (HTP), a memory controller, and memory.

27. The non-transitory machine readable media of claim 26, wherein detecting the transposition of the matrix to the fully connected layer and creating the modified neural network model are performed by a just-in-time (JIT) compiler of the memory device.

28. The non-transitory machine readable media of claim 26, wherein the memory device is configured to:

be included in a vehicle control system that interfaces with a camera of the vehicle configured to capture images as a vehicle operates; and provide facial recognition and bounding boxes of faces in the images through the inference on the computer hardware.

29. The non-transitory machine readable media of claim 19, wherein providing the modified neural network model for inference on the computer hardware includes creating at least one of an installation package, an executable application, a loadable module, or a script to run on the computer hardware.

* * * * *